(12) United States Patent  
Ando et al.

(10) Patent No.: US 8,152,865 B2
(45) Date of Patent: Apr. 10, 2012

(54) ELECTRICAL STORAGE DEVICE AND MANUFACTURING METHOD OF THE SAME

(75) Inventors: Nobuo Ando, Tokyo (JP); Shinichi Tasaki, Tokyo (JP); Yukinori Hato, Tokyo (JP); Chisato Marumo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/862,155

(22) Filed: Aug. 24, 2010

(65) Prior Publication Data

US 2011/0041324 A1 Feb. 24, 2011

Related U.S. Application Data

(62) Division of application No. 10/540,907, filed as application No. PCT/JP03/16666 on Dec. 25, 2003, now abandoned.

(30) Foreign Application Priority Data

Dec. 26, 2002 (JP) ................................. 2002-378236

(51) Int. Cl.
 *H01M 10/04* (2006.01)
 *H01M 10/052* (2010.01)
 *H01M 10/058* (2010.01)
(52) U.S. Cl. ...................................................... 29/623.1
(58) Field of Classification Search .................. 29/623.1
 See application file for complete search history.

(56) References Cited

U.S. PATENT DOCUMENTS

| 5,750,287 | A | 5/1998 | Kinoshita et al. |
| 6,025,093 | A * | 2/2000 | Herr ........................... 429/231.4 |
| 6,222,723 | B1 | 4/2001 | Razoumov |
| 6,335,115 | B1 | 1/2002 | Meissner |
| 6,461,769 | B1 | 10/2002 | Ando et al. |
| 6,576,365 | B1 | 6/2003 | Meitav et al. |
| 6,653,018 | B2 | 11/2003 | Takahashi et al. |
| 6,862,168 | B2 | 3/2005 | Ando et al. |
| 2001/0046623 | A1 * | 11/2001 | Akahira ........................... 429/94 |

FOREIGN PATENT DOCUMENTS

| CN | 1192292 | 9/1998 |
| CN | 1244954 | 2/2000 |

(Continued)

*Primary Examiner* — Gregg Cantelmo
(74) *Attorney, Agent, or Firm* — McDermott Will & Emery LLP

(57) ABSTRACT

An electrical storage device having a positive electrode, a negative electrode, a lithium electrode, and an electrolyte capable of transferring lithium ion, the lithium electrode is out of direct contact with the negative electrode, and lithium ion is supplied to the negative electrode by flowing a current between the lithium and negative electrode through an external circuit. A method of using the electrical storage device includes using the lithium electrode as a reference electrode, the positive electrode potential and negative electrode potential is measured, and the potential of the positive or negative electrode is controlled during charging or discharging. The potentials of the positive electrode and negative electrode are monitored to easily determine whether deterioration of the electrical storage device is caused by the positive or negative electrode. It is possible to control the device with the potential difference between the negative electrode and reference electrode, using the negative potential.

2 Claims, 16 Drawing Sheets

FOREIGN PATENT DOCUMENTS

| | | |
|---|---|---|
| JP | 64-014870 A | 1/1989 |
| JP | 05-041249 A | 2/1993 |
| JP | 08-107048 A | 4/1996 |
| JP | 08-190934 A | 7/1996 |
| JP | 2000-306608 A | 11/2000 |
| JP | 2001-015177 A | 1/2001 |
| JP | 2002-324585 A | 11/2002 |
| WO | 95/08852 A1 | 3/1995 |
| WO | 98/33227 A1 | 7/1998 |
| WO | 02/061863 A1 | 8/2002 |

\* cited by examiner

ELECTRICAL STORAGE DEVICE AND MANUFACTURING METHOD OF THE SAME

CROSS-REFERENCE TO RELATED APPLICATIONS

This application is a Divisional of U.S. patent application Ser. No. 10/540,907, filed on Jun. 27, 2005, abandoned, which is a U.S. national phase application under 35 U.S.C. §371 of International Patent Application No. PCT/JP2003/016666 filed on Dec. 25, 2003, and claims the benefit of priority to Japanese Patent Application No. 2002-378236, filed on Dec. 26, 2002, the entire contents of each of which are hereby incorporated by reference.

TECHNICAL FIELD

The present invention relates to an electrical storage device and a manufacturing method of an electrical storage device capable of readily preventing non-uniform carrying when lithium ions are carried to a negative electrode, and shape-changing of a negative electrode.

BACKGROUND ART

Recently, with a high energy concentration, secondary battery having a positive electrode such as a conductive polymer and a transition metal oxide and a negative electrode such as a lithium metal or a lithium alloy (hereinafter, briefly referred to as a lithium metal) has been proposed to replace a Ni—Cd battery and a lead battery. However, when charging and discharging are repeatedly performed, this secondary battery is subject to large reduction of capacity due to degradation of the positive electrode or the negative electrode, and thus there remains a practical problem. In particular, degradation of the negative electrode leads to generation a mossy lithium crystal called as a dendrite, and with repetitive charging and discharging the dendrite penetrates a separator to cause a short-circuit inside the battery, and in some cases, there might have a problem in terms of safety such as explosion of the battery.

Here, in order to solve the foregoing problems, a battery has been proposed having a negative electrode made of a carbon material such as graphite and a positive electrode made of a lithium containing metal oxide such as $LiCoO_2$. This battery is a so-called rocking chair type battery such that, after assembling the battery, the lithium is supplied from the lithium containing metal oxide of the positive electrode to the negative electrode for charging and the lithium of the negative electrode is supplied backed to the positive electrode for discharging. This is distinguished from the lithium battery that uses metal lithium in that only the lithium ions are used in charging and discharging rather than using the metal lithium at the negative electrode, so that it is called as a lithium ion secondary battery. This battery has characteristics such as high voltage, high capacity, and high stability.

The lithium ion secondary battery is widely used for a mobile phone and a notebook personal computer, and thus there is a need for improvement of energy density. Generally, increases in each discharging capacity of the positive electrode and the negative electrode, improvement of charging and discharging efficiency, and improvement of electrode density are examined. In general, in designing a cell, a thickness and a density of each electrode is determined such that a charging amount of the positive electrode is identical to a charging amount of the negative electrode. Therefore, a discharging capacity of the cell is determined by a the lower efficiency between charging and discharging efficiencies of the positive electrode or the negative electrode, and thus a cell capacity grows larger as the charging and discharging efficiency is increased.

A research and development has been made on the negative electrode that uses an amorphous material such as tin oxide or polyacenic semiconductor (hereinafter, referred to as PAS) as a negative electrode for the lithium ion secondary battery. Examples of the PAS, which can be obtained through annealing aromatic polymer, includes insoluble and infusible base having a polyacene-based skeletal structure as disclosed in Japanese Examined Patent Application Publication Nos. Hei1-44212, and Hei3-24024. In addition, the PAS having a BET specific surface area of 600 $m^2/g$ can be obtained through a method disclosed in a method disclosed in Japanese Examined Patent Application Publication No. Hei3-24024. These amorphous materials have a high capacity, and a high nonreversible capacity. For this reason, with a typical arrangement of the typical lithium ion secondary cell, 100% of a negative electrode capacity can be used while only 60 to 80% of a positive electrode capacity can be used, which leads to not that high capacity.

With respect to this, the inventors herein achieved a high capacity by carrying the lithium ion to the negative PAS in advance, according to a method disclosed in Japanese Unexamined Patent Application Publication No. Hei8-7928. With the lithium ion to the negative PAS, 100% of discharging capacity for both the positive and negative electrodes can be used and thus a high capacity can be achieved, compared to a conventional design where only 60 to 80% of the positive electrode capacity can be used.

As described above, the lithium ion secondary battery has been studied as a high capacity and powerful power supply and commercialized as a primary power supply of typical notebook computer or mobile telephone. Of these, the mobile telephone has progressed into a small-sized and light-weighted one, and thus there is also a need for a small sized and light weighted lithium ion secondary ion used for the primary power supply. As a result, an outer case of a squared battery is changed from iron to aluminum and a weight is significantly reduced. In addition, there is a need for a thin battery having a thickness of 4 mm or 3 mm, so that a film battery that uses an aluminum laminated film as an outer material has been widely used with an increasing pace. In addition, while focusing on environmental issues, a storage system of a regenerative energy using a solar photovoltaic or a wind power plant, a distributed type power supply for the purpose of regulating a power load, or an automobile power supply (main power and auxiliary power) involved in a gasoline car have been progressively developed. In addition, up to now, while a lead battery is used for a power supply of electric equipment of the automobile, apparatuses such as a power window or a stereo has recently improved, and thus there is a need for a new power supply in terms of an energy density and an output density. At the same time, in terms of battery shape, there is also a need for an arrangement of a thin frame that uses a laminated film as an outer case, compared to the conventional rounded or squared type. This is less restrictive to location for a case where a space is limited such as a load conditioner installed in the household or a vehicle trunk, and thus, examination thereof is substantially progressed.

Like this, a film type lithium ion secondary battery has been widely used in various fields as a high capacity and space saving power supply.

As a method of carrying lithium ion to the negative electrode of the lithium ion secondary battery in advance, one cell having metal lithium in addition to the lithium ion secondary battery is arranged to carry a predetermined amount of lithium ion into the negative electrode, however, it is not desirable due to its complicated manufacturing process.

Regarding this, as an industrially convenient way, a method of electrochemically contacting the lithium metal and a negative electrode arranged in the cell is proposed. In a given method, carrying the lithium ion with electrochemical contact between the lithium metal and the negative electrode can be facilitated by using a material having an opening that penetrates a front and rear surfaces, such as expanded metal, as a positive electrode collector and a negative electrode collector. In addition, the lithium ion can be readily carried with the lithium metal arranged to face the negative or positive electrode.

However, in the method of electrochemically contacting the lithium metal and the negative electrode, carry is non-uniformly provided between the negative electrode arranged near the lithium metal and the negative electrode around far from the lithium metal, or even between a center and a corner in a sheet of the negative electrode. In addition, it is impossible to check whether a predetermined amount of lithium ion is carried, and thus a voltage of the electrical storage device is just used as a reference.

Further, in the method of electrochemically contacting the lithium metal with the negative electrode, while carry of the lithium ion is initiated at the time of injecting the electrolyte, the electrode is not well fixed at the time of injecting the electrolyte solution. Therefore, a problem occurs that the negative electrode is hardened in a rippled shape.

In particular, for a thin film type electrical storage device that uses an aluminum laminated film as an outer case material, a contact pressure from the outer container is weak so that the phenomenon appears noticeably, and the strain and wrinkle of electrode leads to cell shape-change. When the lithium ion is carried with the electrode in the rippled shape, it will be hardened as it is, thus leading to the distorted cell and thus degradation of the battery performance.

In addition, when carry of the lithium ion is initiated, the negative electrode emits a heat and thus a temperature increases. Here, when the temperature increases while the cell is not fully sealed, a problem such as solvent evaporation may occur. In particular, when more than two types of solvents are mixed, a composition of the solvents may vary, which causes non-uniform characteristics between cells.

Therefore, an object of the present invention is to provide an electrical storage device and a manufacturing method of an electrical storage device, with which the electrical storage device can be easily manufactured, it can be checked whether a predetermined amount of lithium ion is carried, the potential of a positive or negative electrode can be controlled at the time of charging and discharging, and non-uniform carry of the lithium ion and shape-change of the negative electrode can be readily prevented.

DISCLOSURE OF THE INVENTION

In order to solve the above-mentioned problems and to achieve the objects, an electrical storage device includes a positive electrode, a negative electrode, a lithium electrode and an electrolyte capable of transferring lithium ion, and the lithium electrode is arranged to be out of direct contact with the negative electrode and/or the positive electrode. Lithium ion can be supplied to the negative electrode and/or the positive electrode by flowing current between the lithium electrode and the negative electrode and/or the positive electrode through an external circuit.

According to the invention, problems such as non-uniform carry of lithium ion to the negative electrode and/or the positive electrode, shape-change of a cell, and temperature increase of an electrolytic solution under incomplete sealing of a cell can be easily solved.

For example, when the negative electrode lithium ion is carried, conventionally, the lithium electrode and the negative electrode arranged in the cell are electrochemically contact so that the carry of lithium ion is initiated at the time of injecting electrolyte, and thus there occurs a problem in that non-uniform of the carry is generated between a portion that the lithium ion is easily carried and a portion that the lithium ion is not easily carried, or that the negative electrode is hardened in the ripple shape. According to the present invention, the carry of lithium ion is initiated by flowing current between the lithium electrode and the negative electrode. Therefore, lithium ion carry timing can be easily controlled, and thus, for example, after sealing to the outer container, the carry of lithium ion can be initiated to the negative electrode with planarized positive and negative electrodes and an electrical storage device having a high surface flatness can be easily manufactured.

In addition, in the conventional method, lithium ion is transferred while the electrical storage device is not completely sealed, so that there is a problem in that temperature of electrolyte increases and a solvent is evaporated. However, in the present invention, the lithium ion carry timing can be easily controlled, so that a temperature increase of the electrolyte while the electrical storage device is not completely sealed can be easily avoided.

Further, in the conventional method, the lithium electrode and the negative electrode arranged in the cell are electrochemically contact, so that the potential difference between the lithium electrode and the negative electrode becomes 0 V. Regarding the resistance of lithium electrode, it takes a substantial amount of time to carry lithium ion since the potential of the negative electrode is higher than 0 V. However, according to the present invention, the current can be flowed between the negative electrode and the lithium electrode through the external circuit, so that, for example, a minus voltage is applied between the negative electrode and the lithium electrode. Thus the lithium ion can be forcefully carried and a time to carry lithium ion can be reduced.

In addition, in the conventional method, the lithium electrode and the negative electrode arranged in the cell are electrochemically contact, so that the carry of lithium ion is initiated at the time of injecting the electrolyte. Thus, in the beginning, a large current partially flows so that mossy metal lithium is generated at a portion of the negative electrode, which may cause a shirt-circuit. However, according to the present invention, since the current flowing between the negative electrode and the lithium electrode through the external circuit can be controlled, the lithium ion can be carried in a current that does not generate the mossy metal lithium.

Further, the electrical storage device of the present invention includes cells, in which metal lithium is additionally provided as a counter electrode, thereby a complicated manufacturing process such as carrying a predetermined amount of lithium ion in the negative electrode is not required, and the electrical storage device can be easily manufactured.

In addition, when the lithium electrode can supply the lithium ion to the negative electrode and/or the positive electrode, the carry of lithium ion to the negative electrode is provided by electrochemically contacting the lithium electrode and the negative electrode arranged in the cell, as described above, and the lithium electrode can be used as a reference electrode. At this time, the above-mentioned problems occurs since the carry of lithium ion is initiated before sealing, but it can be properly determined whether the predetermined amount of lithium ion is carried to the negative electrode, by measuring a potential difference between the lithium electrode and the negative electrode. In this case, it is more desirable in finding a lithium ion carry amount that non-uniform carry of lithium ion and shape-change of a cell are suppressed with both the lithium electrode for supplying the negative electrode lithium ion and the lithium electrode as a reference electrode.

In addition, in the electrical storage device, the electrolyte may be made of a lithium salt aprotic organic solvent solution.

With the invention, the lithium salt aprotic organic solvent solution is used as the electrolyte, so that, preferably, the solvent is not electrically decomposed even in a high voltage.

In addition, the positive electrode and the negative electrode may be formed on a positive electrode collector and a negative electrode collector, respectively. Further each of the positive and negative electrode collectors may have an opening that penetrates a front and rear surfaces.

According to the invention, the lithium ion can be freely transferred through the penetrating hole between respective electrodes, so that the carry of lithium ion to the negative electrode and/or the positive electrode from the lithium electrode and charging and discharging can be facilitated.

In addition, the lithium electrode may be formed on a lithium electrode collector made of a conductive porous body, and at least a part of the lithium electrode may be buried on a porous portion of the lithium electrode collector.

According to the invention, at least the part of the lithium electrode is buried into pores of the lithium electrode collector, so that the lithium ion is carried to the negative electrode and/or the positive electrode from the lithium electrode, and even when the lithium electrode is vanished, a gap generated between the electrodes caused by a loss of the lithium electrode is preferably small.

In addition, the electrical storage device may have an outer container made of a laminated film.

The laminated film is used as an outer container, so that the electrical storage device can be preferably small-sized and light-weighted. In addition, while the film type electrical storage device protected with the laminated film has a weak contact pressure from the outer container, so that strain, shape-change and the like of the electrode may directly lead to shape-change of a cell. However, with the arrangement of the present invention, the above problems can be easily solved.

In addition, according to the electrical storage device, the lithium electrode may be arranged to face the negative electrode and/or the positive electrode.

Since the lithium electrode is arranged to face the negative electrode and/or the positive electrode, preferably, the lithium ion can be smoothly carried to the negative electrode and/or the positive electrode from the lithium electrode.

In addition, the electrical storage device may further include an electrode stack unit having an electrode couple stacked in more than three layers, in which the electrode couple has the positive electrode and the negative electrode.

More than three layers are stacked to form an electrode couple that includes the positive electrode and the negative electrode, so that a surface area of the electrode can be increased without enlarging an area of the electrical storage device. Thus, preferably, with a compact size, it has a low internal resistance and a large storage capacity.

In addition, the electrical storage device may further include an electrode stack unit having an electrode couple rolled, in which the electrode couple has the positive electrode and the negative electrode.

With the invention, the electrode couple having the positive electrode and the negative electrode is rolled, so that the surface area of the electrode can be increased without enlarging an area of the electrical storage device. Thus, preferably, with a compact size, it has a low internal resistance and a large storage capacity.

In addition, the electrical storage device may be made of a capacitor.

The electrical storage device of the present invention capable of carrying a predetermined amount of lithium ion to the negative electrode in advance is used for a capacitor, so that the potential of the negative electrode can be reduced and preferably a capacitor having a large storage capacity can be obtained.

Further, the positive electrode may contain a material that can reversibly carry the lithium ion and/or anions as a positive electrode active material. The negative electrode may contain a material that can reversibly carry the lithium ion as a negative electrode active material. Furthermore, an electrostatic capacitance per unit weight of the negative electrode active material may be more than three times larger than an electrostatic capacitance per unit weight of the positive electrode active material. In addition, a weight of the positive electrode active material may be larger than a weight of the negative electrode active material.

By using the negative electrode active material having an electrostatic capacitance per unit weight larger than an electrode capacitance per unit weight of the positive electrode active material, and making a weight of the positive electrode active material larger than a weight of the negative electrode active material, an electrostatic capacitance and a capacity of the capacitor can be increased. In addition, by containing in the negative electrode a material that can reversibly carry lithium ion as the negative electrode active material, a predetermined amount of lithium ion is carried to the negative electrode in advance to obtain a capacity required for the negative electrode capacity. Thus, the potential of the negative electrode can be further reduced, and density can be improved with an increased breakdown voltage of the capacitor energy. In addition, by reducing the potential of the negative electrode, an amount of the potential change in discharging of the positive electrode can be increased.

The negative electrode active material is a thermal-processed aromatic condensed polymer, and is an insoluble and infusible base having a polyacene-based skeletal structure with a hydrogen/carbon atomic ratio in the range of 0.50 to 0.05.

The insoluble and infusible base, which has a polyacene-based skeletal structure, and is used as the negative electrode active material, does not vary the structure, for example, swell or contract when lithium ion are inserted and seceded, thereby the electrical storage device has an excellent cyclic characteristic. Also, the electrical storage device has an isotropic molecular structure (high-order structure) to insertion and secession of lithium ion, thereby excellent characteristics for rapid charging and rapid discharging can be obtained.

A part of lithium electrode may exist in the lithium electrode collector after the lithium ion supplying process.

It is possible to use the lithium electrode as a reference electrode after carrying the lithium ion to the negative electrode and/or the positive electrode, so that the electrical storage device preferably has a simple arrangement. Further, the existing lithium electrode can be used for regenerating the capacity of the electrical storage device.

The electrical storage device can be used as a typical consumer electrical apparatus, vehicles such as an electrical automobile and a bicycle, and an apparatus for electrical storage of a natural energy.

In addition, a manufacturing method of an electrical storage device includes assembling a positive electrode, a negative electrode, a lithium electrode and an electrolyte capable of transferring lithium ion, through which the positive electrode, the negative electrode and lithium electrode are arranged to be out of direct contact with each other; and supplying the lithium ion to the negative electrode and/or the positive electrode by flowing a current between the lithium electrode and the negative electrode and/or the positive electrode through an external circuit.

After assembling the electrical storage device having three electrodes, i.e., the positive electrode, the negative electrode and the lithium electrode, the lithium ion is supplied to the negative electrode and/or the positive electrode from the lithium electrode by flowing a current between the lithium electrode and the negative electrode and/or the positive electrode through the external circuit. Therefore, problems such as non-uniform carrying of lithium ion to the negative electrode and/or the positive electrode, shape-change of a cell, and temperature increase of an electrolytic solution under incomplete sealing of a cell can be easily solved.

In addition, according to the manufacturing method of the electrical storage device, after the lithium supplying process, a total amount of the lithium ion for the lithium electrode may elute.

After the lithium supply process, the lithium that exists in the lithium electrode is used for lithium ion, so that a highly stable electrical storage device can be obtained. In addition, by shorting between the lithium electrode and the negative electrode and/or the positive electrode, the supply of lithium ion is facilitated, so that the lithium ion supply process is simplified.

After the lithium ion supplying process, a part of the lithium electrode may exist in the lithium electrode collector.

Since the excessive lithium metal is prepared at the lithium electrode, a predetermined amount of lithium ion can be smoothly supplied. Conventionally, when a total amount of lithium ion is consumed, a resistance of the lithium electrode is increased, since an area of the lithium metal is gradually reduced, and thus, there needs a time to consume the total amount. However, according to the present invention, even when the predetermined amount of lithium ion is consumed, the area of the lithium metal is not changed so that the lithium ion can be smoothly supplied.

In addition, according to a method of using the electrical storage device, the positive electrode and the negative electrode can be measured using a lithium electrode as a reference electrode. Further, the positive electrode or the negative electrode can be controlled when the electrical storage device is charged or discharged.

By using a reference electrode when the electrical storage device is charged and discharged, the potentials of the positive electrode and the negative electrode can be monitored, and thus when the electrical storage device is deteriorated, it can be easily determined whether deterioration is caused by the positive electrode or the negative electrode. Furthermore, it also becomes possible to control the device according to the potential difference between the negative electrode and reference electrode, namely the negative potential, rather than a voltage between the positive electrode and the negative electrode. For example, it is possible to finish charging before the potential of the negative electrode falls below O V at the time of charging the electrical storage device.

In addition, according to a method of using the electrical storage device, after using the electrical storage device, or after degradation of characteristics, the lithium ion may be supplied from the lithium electrode to the negative electrode and/or the positive electrode by flowing a current between the lithium electrode and the negative electrode and/or the positive electrode through the external circuit.

When characteristics are degraded such as increase in an internal resistance while using the electrical storage device, an appropriate amount of lithium ion is supplied again to the negative electrode and/or the positive electrode, so that internal resistance of the electrical storage device can be improved and the capacity thereof can be regenerated.

The electrical storage device of the present invention is characterized to include three electrodes, i.e., a positive electrode, a negative electrode and a lithium electrode. The lithium ion can be carried to the negative electrode and/or the positive electrode by flowing current between the negative electrode and/or the positive electrode through the external circuit, so that problems such as non-uniform carrying of lithium ion to the negative electrode, shape-change of a cell, and temperature increase of an electrolytic solution under incomplete sealing of a cell can be easily solved.

When a voltage of O V is applied to the negative electrode relative to the lithium electrode, current is flowed into the lithium electrode so that the lithium ion eluted out of the lithium electrode are transferred through the electrolyte and carried to the negative electrode.

The 'positive electrode' refers to an electrode at the side into which the current flows at the time of charging, while the 'negative electrode' refers to an electrode at the side out of which the current flows at the time of charging. Thus, at the time of discharging, the lithium ion carried to the negative electrode are emitted out, transferred through the electrolyte, and carried to the positive electrode. In addition, at the time of charging, the lithium ion carried to the positive ions are carried again to the negative electrode.

Preferred embodiments of the present invention will now be described with reference to the drawings. FIG. 1 is a perspective view of an inner arrangement of the electrical storage device according to the present invention. In FIG. 1, the inner arrangement of the electrical storage device is shown in a solid line, while an outer arrangement of the electrical storage device is shown in a dotted line. The electrical storage device of the present invention includes a three-electrode stack unit in which a positive electrode 1, a negative electrode 2, a lithium electrode 7 and a separator 3 are stacked in laminated films 4 and 5. Here, lithium ion are injected into transferable electrolyte, and then two sheets of laminated films 4 and 5 are sealed through heat sealing.

As shown in FIG. 1, the positive electrode 1 in which a positive electrode laminated material 1c including a positive electrode active material is formed on a positive electrode collector 1a, and the negative electrode 2 in which a negative electrode laminated material 2c including a negative electrode active material is formed on a negative electrode collector 2a are stacked through the separator not to directly contact with each other, and thus to form an electrode stack unit 6. The lithium electrode 7 attaching a lithium metal 7c on one surface of a lithium electrode collector 7a is arranged on the electrode stack unit 6 not to directly contact with the negative electrode 2, thus to form a three-layered stack unit. According to the present invention, it is important that the negative electrode 2 and the lithium electrode 7 are arranged not to contact in the cell. When the negative electrode 2 contacts with the lithium electrode 7, the carry of lithium is initiated at the time of injecting electrolyte, problems such as such as non-uniform carrying of lithium ion to the negative electrode, shape-change of a cell, and temperature increase of an electrolytic solution under incomplete sealing of a cell can be undesirably generated.

FIG. 2 is a bottom view of the electrical storage device of FIG. 1, and FIG. 3 is a cross-sectional view taken along I-I' line of FIG. 2. In FIG. 3, the electrode stack unit 6 has a positive electrode 1 and a negative electrode 2, each being four-layered electrode, but the arrangement of the electrode stack unit is not limited thereto, and once at least one positive electrode and at least one negative electrode are provided, the number of layers for the positive and negative electrodes are not specially limited.

In addition, in FIG. 3, for a three-electrode stack unit 8, while the lithium electrode 7 is arranged on the electrode stack unit 6, a position, the number of layer, and a shape of the lithium electrode are not limited thereto. However, to facilitate carrying lithium ion, it is desirable that the lithium electrode is arranged to face the negative electrode or the positive electrode.

According to the electrical storage device of the present invention, the negative electrode and the lithium electrode are arranged not to directly contact with each other in the cell. In an example of FIG. 1, the separators 3 are arranged among respective electrodes, not to cause the positive electrode 1, the negative electrode 2, and the lithium electrode 7 to directly contact with each other. In the cell, a liquid electrolyte in which the lithium ions can be transferred is filled, and the separator 3 that separates each electrode is impregnated. The electrolyte is typically a liquid phase and impregnated to the separator 3, but when the separator 3 is not used, a gel type or a solid phase electrolyte may be used to prevent leakage of the electrolyte and not to cause the positive electrode 1, the negative electrode 2, and the lithium electrode 7 to directly contact with each other.

Each of the positive electrode collector 1a, the negative electrode collector 2a, and the lithium electrode collector 7a has an opening (not shown) that penetrates a front and rear surfaces, and thus the lithium ion can be freely transferred between respective electrodes through the given penetrating hole. For this reason, the carry of lithium ion to the negative electrode from the lithium electrode can be smoothly progressed. In addition, in charging and discharging, the lithium ion can be smoothly transferred between the positive and negative electrodes.

As shown in FIG. 2, the positive electrode collector 1a, the negative electrode collector 2a, and the lithium electrode collector 7a have protrusion portions having terminal connection portions A', B', and B', respectively. The terminal welding portion A' (two sheets) of the positive electrode collector 1a and the positive electrode terminal 1b, the terminal welding portion B' (three sheets) of the positive electrode collector 1b and the negative electrode terminal 2b, and the terminal welding portion B' (one sheet) of the lithium electrode collector 7a and the lithium electrode terminal 7b are welded together, respectively.

The laminated films 4 and 5 are sealed with the positive electrode terminal 1b, the negative electrode terminal 2b, and the lithium electrode terminal electrode therebetween, and the positive electrode terminal 1b, the negative electrode terminal 2b, and the lithium electrode terminal 7b are heat sealed to the laminated films 4 and 5 respectively, at heat sealing portions A, B, and B, shown in FIG. 2. That is, in an example of FIG. 2, the electrical storage device is sealed at the heat sealing portions A, B, and C between the laminated films 4 and 4 and respective terminals, and the heat sealing portion D between the laminated films 4 and 5. Therefore, the positive electrode terminal 1b, the negative electrode terminal 2b, and the lithium electrode terminal 7b are protruded from between the laminated films 4 and 5 to the outer portion of the battery, so that the positive electrode 1, the negative electrode 2 and the lithium electrode 7 can be connected to the external circuit through respective terminals.

While shapes and sizes of the positive electrode terminal 1b, the negative electrode terminal 2b, and the lithium electrode terminal 7b are not specifically limited, but a thicker and larger terminal is preferable, if possible, so long as a sufficient airtight can be provided in a limited cell volume. It is very appropriate that each terminal shape and size is selected in response to target cell characteristics.

As described above, each collector 1a, 2a, and 7a has an opening that penetrates a front and rear surfaces respectively, so that the lithium ion can be freely transferred between respective terminals through the given penetrating hole. For example, when a voltage of 0 V is applied to the negative electrode 2 relative to the lithium electrode 7 through the negative electrode terminal 2b and the lithium electrode terminal 7b, the lithium ion eluted from the lithium metal 6c to the electrolyte are transferred through the penetrating hole, and carried to the negative electrode laminated material 2c. In addition, at the time of discharging, the lithium ion carried to the negative electrode laminated material 2c are flowed out, transferred into the electrolyte, and carried to the positive electrode laminated material 1c, but at this time, the current may be flowed out through the positive electrode terminal 1b and the negative electrode terminal 2b. In addition, at the time of charging, when a voltage is applied between the positive electrode 1 and the negative electrode 2 through the positive electrode terminal 1b and the negative electrode terminal 2b, the lithium ion doped into the positive electrode laminated material 1c are carried again to the negative electrode laminated material 2c.

When the voltage of 0 V is applied to the negative electrode 2 relative to the lithium electrode 7, the lithium metal 7c emits lithium ions, and thus becomes reduced. An amount of the light metal 7c (lithium ion contained in the lithium electrode) arranged in the electrical storage device will be sufficient once the target electrostatic capacitance of the negative electrode can be obtained, however, when more than the amount thereof is arranged, only a predetermined amount of the lithium metal 7c is used to carry and then a part of the lithium metal 7c may exist in the electrical storage device (definition of the electrostatic capacitance will be described below.) When there exists the part of the lithium metal 7c, it is also possible to use the lithium electrode 7 as a reference electrode in order to determine the potential of the positive or negative electrode. However, in terms of safety, it is desirable that a required amount is arranged to cause the total amount to carry the negative electrode, and it is desirable that an amount of lithium ion be appropriately set depending on a target.

The electrical storage device of the present invention will now be described in detail in the following order.

[A] negative electrode, [B] positive electrode, [C] positive electrode collector and negative electrode collector, [D] lithium electrode, [E] lithium electrode collector, [F] electrolyte, [G] outer container, [H] various uses of electrical storage device, [I] specific example of an inner arrangement, and [J] electrical storage device manufacturing method.

[A] Negative Electrode

In the electrical storage device of the present invention, the negative electrode includes the negative electrode laminated material and the negative electrode collector, and the negative electrode laminated material contains a negative electrode active material capable of reversibly carrying the lithium ion.

The negative electrode active material, which is not specifically limited if it can be used to carry the lithium, may include various carbon materials, for example, graphite, a polyacenic material, tin oxide, and silicon oxide.

When an active material having a so-called amorphous structure, in which the potential is gradually reduced as the lithium ion is inserted and the potential is increased as the lithium ion is emitted, such as a polyacenic organic semiconductor (PAS), is used, the potential is reduced by as much as the lithium ion is carried. Thus, a breakdown voltage of the capacitor (charging voltage) that can be obtained is increased. Further, an increase rate of the voltage (slope of the discharging curve) for the discharging is lowered, so that the capacity is a bit increased. Therefore, in response to the voltage of the required capacitor, it is desirable that an amount of lithium ion be appropriately set within a lithium ion occlusion capability of the active material.

Since the PAS has an amorphous arrangement, it does not have an arrangement variation such as swelling and contraction relative to insertion and secession of the lithium ions, thus showing an excellent cyclic characteristic, and has an isotropic molecular structure (high-order structure) relative to insertion and secession of the lithium ions, thus preferably obtaining excellent characteristics for a rapid charging and a rapid discharging. Thus, the PAS is very appropriate as a negative electrode active material.

As the negative electrode active material of the present invention, for a thermal-processed material of an aromatic condensed polymer, it is desirable that an insoluble and infusible base be used having a polyacene-based skeletal structure with a hydrogen/carbon atomic ratio of 0.50 to 0.05.

Here, the aromatic condensed polymer refers to a condensate of an aromatic hydrocarbon compound and an aldehyde group. The aromatic hydrocarbon compound may use a so-called phenol group such as phenol, cresol, and xylenol.

For example, the aromatic hydrocarbon compound can be a methylene bisphenol group, which is represented as the following equation, a hydroxy biphenyl group or a hydroxy naphthalene group. Among these, a phenol group, particularly phenol is the most preferable from a viewpoint of practical use.

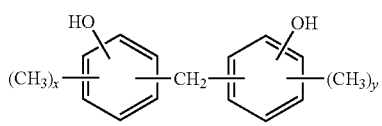

[Formula 1]

(wherein x and y are independently from each other, in a range of 0, 1 or 2)

In addition, the aromatic condensed polymer includes a modified aromatic condensed polymer that replaces one unit of an aromatic hydrocarbon compound having a phenol hydroxyl radical with an aromatic hydrocarbon compound not having the phenol hydroxyl radical, such as xylene, toluene, and aniline, for example, a condensate of phenol, xylene, and formaldehyde. Further, there may be a modified aromatic polymer replaced with melanin and urea, and a furan resin can be very appropriately used.

As the aldehyde, formaldehyde, acetaldehyde, and furfural may be used, and among these, formaldehyde is preferable. In addition, a phenol formaldehyde condensate may be any one of a novolac type or a resole type, or a combination thereof.

The insoluble and infusible base, which can be obtained by annealing the aromatic group polymer, may include any insoluble and infusible base having the above-mentioned polyacene-based skeletal structure.

The insoluble and infusible base for use in the present invention can be manufactured, for example, as follows. That is, the aromatic condensed polymer is slowly heated up to a temperature of 400 to 800° C. under a non-oxide atmosphere (including vacuum), so that the insoluble and infusible base having a hydrogen/carbon atomic ratio (hereinafter, referred to as H/C) of 0.5 to 0.05, and preferably, 0.35 to 0.10 can be obtained.

In addition, with the above method, the insoluble and infusible base having a BET specific surface area of more than 600 $m^2/g$ can be obtained. For example, a solution is prepared including an initial condensate of the aromatic condensed polymer and inorganic salts, for example, zinc chloride, and hardened in a frame by heating the solution so that the insoluble and infusible base having a high specific surface area can be obtained.

The hardened body obtained in this manner is slowly heated up to an appropriate temperature of 350 to 800° C., preferably, 400 to 750° C. under the non-oxide atmosphere (including atmosphere), and then, is sufficiently cleansed using water and dilute hydrochloric acid. Therefore, with the above H/C, the insoluble and infusible base having a BET specific surface area of more than 600 $m^2/g$ can be obtained.

For the insoluble and infusible base for use in the present invention, with an X-ray diffraction (CuKa), a position of a main peak is indicated as 2θ, existing in less than 24°, and in addition to the main peak, there also exist another peak that is broad in a range of 41 to 46°. That is, the insoluble and infusible base has a polyacene-based skeletal structure in which an aromatic polycyclic structure is appropriately developed, and takes an amorphous structure. From this, the lithium ion can be stably doped so that it can be used as the battery active material.

The negative electrode of the present invention contains the negative electrode active material such as the PAS, and the negative electrode active material that can be easily formed in a powdered form, a grain form, and a short fiber form is preferably formed in a binder. The binder may use, for example, a rubber type binder such as SBR, a fluorine-based resin such as polytetrafluoroethylene, and polyvinylidene, a thermoplastic resin such as polypropylene and polyethylene, and among these, preferably use a fluorine-based binder, and more preferably, a fluorine-based binder is used having an atomic ratio of a fluoride atom to a carbon atom (hereinafter, referred to as F/C) of preferably more than 0.75 to less than 1.5, and more preferably more than 0.75 to less than 1.3.

The fluorine-based binder may use, for example, polyvinylidene, a vinylidene-trifluoroethylene copolymer, an ethylene-tetrafluoroethylene copolymer, and a propylene-tetrafluoroethylene copolymer. Further, a fluorine-based polymer that replaces hydrogen of a main chain with an alkyl group can be used.

For the polyvinylidene, the F/C is 1, and for the vinylidene-trifluoroethylene copolymer, when a mole fraction of the vinylidene is 50% or 80%, the F/C is 1.25 and 1.1, respectively. Further, for the propylene-tetrafluoroethylene copolymer, when the mole fraction of the propylene is 50%, the F/C is 0.75. Among these, polyvinylidene, a vinylidene-trifluoro copolymer having a mole fraction of the vinylidene of more than 50% is preferable, and practically, polyvinylidene is preferably used.

When the above binders are used, a dope ability (capacity) of the lithium ion that the PAS has can be sufficiently used.

In addition, the negative electrode active material may use a conductive material such as acetylene black, graphite, and metal power, if needed.

[B] Positive Electrode

For the electrical storage device of the present invention, the positive electrode includes the positive electrode laminated material and the positive electrode collector, and the positive electrode laminated material contains a positive electrode active material. The positive electrode active material, which can reversibly carry lithium ion and/or negative ions such as tetrafluoroborate, though not specifically limited thereto, may include conductive polymer and a polyacenic material, for example. Further, among these, the insoluble and infusible base having a polyacene-based skeletal structure having a hydrogen/carbon atomic ratio of 0.05 to 0.50 (hereinafter, referred to as PAS), which is a thermal-processed aromatic condensed polymer product, is preferably used, and thus a high capacity can be obtained.

The positive electrode of the present invention is formed with a conductive member and a binder, if required, added to the positive electrode active material, and a type and composition of the conductive member and the binder can be properly determined.

The conductive member may preferably use, for example, a carbon group such as an activated carbon, carbon black, an acetylene black and graphite. A composition ratio of the conductive member may vary according electrical conductivity and an electrode shape of the active material, but it is desirable that a ratio of 2 to 40% for the active material is added.

In addition, as long as the binder is insoluble to the following electrolyte, it may be preferably a rubber type finder such as SBR, a fluorine-based resin such as polytetrafluoroethylene and polyfluorovinyliden, and a thermoplastic resin such as polypropylene and polyethylene. In addition, a composition ratio of less than 20% for the active material is provided.

[C] Positive Electrode Collector and Negative Electrode Collector

The positive and negative electrode collectors of the present invention are not specifically limited, but each preferably has an opening that penetrates a front and rear surfaces, and may include, for example, an expanded metal, a punching metal, a net, and a blowing agent. A type and the number of penetrating hole is not specifically limited, but can be properly determined such that lithium ion in the electrolyte described below can be transferred between two faces of the electrode without binding to the electrode collector.

In the present invention, the potentials of the negative electrode and/or the positive electrode can be measured using the lithium electrode, and the potential of the positive or negative electrode can also be controlled at the time of charging and discharging the electrical storage device. At this time, in order to measure the potential of the positive or negative electrode more exactly using a reference electrode, having an opening that penetrates the front and rear surfaces in the positive electrode collector and the negative electrode collector is more preferable than using a foil without an opening in the collector.

A porosity of the electrode collector is defined as {1−(collector weight/collector true specific gravity) (collector appearance volume)} converted into a percentile. When the porosity is high, preferably, a time to carry the lithium ion to the negative electrode is reduced and the non-uniformity is hardly generated. However, it is difficult to retain the active material in the opening, and further, since the strength of electrode is low, a production ratio to form the electrode will be reduced. In addition, the opening, in particular, the active material of the edge is easily fallen off, which leads to short-circuit inside the battery.

One the other hand, when the porosity is low, it takes a time to carry the lithium ion to the negative electrode, but since the strength of the electrode is strong and the active material is difficult to be fallen off, an electrode production ratio is also increased. Considering an arrangement (stack type or rolled type, etc.) and productivity of the electrode, it is desirable that the porosity of the collector and a diameter of the opening be arbitrarily chosen.

In addition, the electrode collector can be typically made of various materials proposed in the organic electrolyte battery, so that the positive electrode collector may use aluminum and stainless and the negative electrode collector may use stainless and nickel.

[D] Lithium Electrode

For the electrical storage device of the present invention, the lithium electrode includes lithium metal and the lithium electrode collector. The lithium metal of the present invention includes a material that can supply lithium ion, by including at least lithium ion such as Li-aluminum alloy in addition to the lithium metal.

Conventionally, one method of carrying a predetermined amount of lithium ion to the negative electrode is to introduce conductive materials such as nickel, copper, and stainless in the cell or to attach the lithium metal on the negative electrode collector. However, in this case, all negative electrodes and lithium electrode are electrochemically contact and the carry of lithium ion to the negative electrode active material is undesirably initiated under a state where the positive electrode and the negative electrode are not sufficiently fixed (contact pressure is not given) due to injection of electrolyte. According to the present invention, it is desirable that the lithium electrode and the negative electrode are arranged independently from each other, in the cell.

Depending on the target, it is desirable that an amount of the lithium ion is properly determined. For example, a thickness of lithium metal is 50 to 300 μm, preferably 80 to 200 μm, and more preferably, 100 to 160 μm.

[E] Lithium Electrode Collector

According to the present invention, the lithium electrode is preferably arranged such that the lithium electrode is attached on the lithium electrode collector made of a conductive porous object. Here, the lithium electrode collector may use a conductive porous object such as a stainless mesh.

When the conductive porous object such as the stainless mesh is used as the lithium electrode collector, at least the part of the lithium metal is preferably buried into a porous portion of the lithium electrode collector. Preferably, more than 80% of the lithium metal is filled into the porous portion of the conductive porous object. With this, even when the lithium ion is carried, a gap generated between the electrodes, caused by loss of the lithium metal, is reduced and the lithium ion is smoothly carried to the negative electrode active material.

An amount of the lithium ion carried to the negative electrode is determined according to a negative electrode member for use and characteristics required in the electrical storage device.

The lithium electrode collector that forms the lithium electrode is preferably arranged to face the negative electrode and/or the positive electrode. With the above arrangement, the lithium ion can be smoothly carried to the negative electrode and/or the positive electrode. For example, it is possible to make the negative electrode terminal and the lithium electrode terminal to carry the lithium to the negative electrode active material by arranging the lithium electrode in a cross sectional direction of the electrode stack unit. However, in this case, when the negative electrode has a long width, the non-uniform carry (non-uniform dope) in the electrode becomes large so that a position of the arranged lithium electrode should be selected considering a cell arrangement and an electrode size.

For the electrical storage device of the present invention, by locally arranging the lithium electrode carried to the negative electrode and/or the positive electrode at the specific position, a degree of freedom and productivity in designing the cell can be improved, and excellent charging and discharging characteristics can be provided.

[F] Electrolyte

An electrolyte used for the electrical storage device of the present invention should be capable of transferring lithium ion. The electrolyte is typically in a liquid phase, and thus impregnated into the separator. However, when the separator is not employed, the electrolyte may be a gel-type or solid phase to prevent leakage and direct contact among the positive electrode, the negative electrode and the lithium electrode. For the separator, porous object without an electron conductivity having an opening durable to the electrolyte or the electrode active material can be used.

The electrolyte in which the lithium ions can be transferred may be preferably an aprotic organic solvent of a lithium salt, from a viewpoint that lithium ion can stably exist without generating electrolysis at a high voltage.

The aprotic organic solvent may be, for example, ethylene carbonate, propylene carbonate, dimethyl carbonate, diethyl carbonate, γ-butyrolactone, acetonitrile, dimethoxyethane, tetrahydrofulan, dioxolan, methylene chloride, and sulfolane. In addition, a mixed solution having more than two types of these aprotic organic solvents can be used.

The electrolyte containing the lithium ion can be obtained by dissolving the supporting electrolyte, which is a lithium ion source in the single or mixed solvent. The electrolyte used for the lithium ion source may be, for example, LiI, $LiClO_4$, $LiAsF_6$, $LiBF_4$, and $LiPF_6$.

The supporting electrolyte and the solvent are fully dehydrated, and then mixed with each other so as to be the electrolyte. However, a concentration of the supporting electrolyte in the electrolyte is preferably more than 0.1 mol/l, and more preferably, in a range of 0.5 to 1.5 mol/l to reduce the internal resistance caused by the electrolyte.

[G] Outer Container

The outer container of the electrical storage device of the present invention is not limited thereto, and may be made of various types of materials generally used in the battery, including a metal material such as Fe and aluminum, and a film material. In addition, a shape of the outer container is not specifically limited thereto, and can be arbitrarily selected from a rounded type, a squared type, and the like, a according to its use. With respect to a small-sized and light-weighted electrical storage device, a film type outer container using an aluminum laminated film is preferably used A typical film battery uses a three-layered laminated film having a nylon film arranged outside as an outer member, an aluminum foil arranged at the center, and a modified polypropylene adhesive layer arranged inside. The laminated film is typically drawn depending on the size and thickness of the electrodes that is fed into, and a unit for stacking or rolling the positive electrode, the negative electrode and the separator is arranged, and after injecting the electrolyte, the laminated film is sealed by the heat sealing. At this time, the positive electrode terminal (typically, an aluminum foil having a thickness of 100 μm and the negative electrode terminal (typically, a Ni foil having a thickness of 100 μm) are protruded out of the battery from a gap of the laminated film. That is, the laminated film is sealed with the positive electrode terminal and the negative electrode terminal interposed therebetween in a simple manner. However, to have the sufficient sealing, it is required that the terminal uses a metal foil described above, or that a sealant film is attached in advance on the terminal surface.

The film battery is weaker than the battery that uses a metal case such as a rounded type or a squared type battery having a contact pressure from the outer container, so that strain and shape-change of the electrode directly leads to shape-change of the cell. The negative electrode is hardened with the carried lithium ion, but when the lithium ion is carried with a rippled electrode, it is hardened as being rippled. Therefore, the cell is also deformed and the performance is degraded. However, when the lithium ion is carried to the negative electrode under a state that flatness of the positive electrode and the negative electrode is taken using a vice and the like, the negative electrode becomes hardened while keeping the flatness. Thus, the cell itself is not deformed, and the performance can be improved.

While the three-electrode stack unit 8 is rolled deep into the laminated film 5 using the laminated films 4 and 5 as an outer container in FIG. 1, one or both of the laminated films 4 and 5 may be drawn. In FIG. 1, using a pair of laminated films, the outer portion is repeatedly heat sealed to cause these to cover the contents, and thus the contents and sealed.

According to the present invention, the film member is not limited to a sheet type film used in FIG. 1, but it may also be already formed in a tube type or a pouch type. When the tube type film member is used, two sides that face each other are heat sealed to encapsulate the contents, and when the pouch type film member is used, one side that is opened is heat sealed to encapsulate the contents.

[H] Various Uses of Electrical Storage Device

The electrical storage device of the present invention refers to a device capable of charging and discharging, and specifically, refers to a secondary battery, a capacitor, and so on. When the electrical storage device of the present invention is used for any kind of use, a basic arrangement, including three electrodes such as the positive electrode, the negative electrode, and the lithium electrode and the electrolyte in which the lithium ion can be transferred, is identical.

The electrical storage device of the present invention will now be described in the context that the electrical storage device is used as a capacitor. In general, the capacitor uses almost the same amount of active materials (typically, activated carbon) in the positive and negative electrodes. The active material for use in the positive and negative electrodes is charged with the potential of about 3 V in assembling the cell, so that anions form an electrical double layer on the positive electrode surface to increase the potential of the positive electrode, while cations form an electrical double layer on the negative electrode surface to reduce the potential. On the other hand, at the time of charging, anions are emitted from the positive electrode into the electrolyte and cations are emitted from the negative electrode into the electrolyte respectively, and the potentials are reduced and increased respectively to turn back to be about 3 V. That is, a shape of charging and discharging curve of the positive electrode and the negative electrode is almost line symmetric with a boundary of 3 V, and thus an amount of the potential change of the positive electrode is almost the same as the amount of the potential change of the negative electrode. In addition, the positive electrode causes substantially only the anions to come in and out while the negative electrode causes substantially only the cations to come in and out.

Further, when the electrical storage device of the present invention is used as a capacitor, the positive electrode preferably uses an active material that can reversibly carry the lithium ion and/or the anions. This also includes an activated carbon used for the positive electrode and the negative electrode of the conventional electrical double layer. In addition, the negative electrode active material having an electrostatic capacitance more than three times larger than the electrostatic capacitance per unit weight of the positive electrode active material is used in the negative electrode, and further, it is designed such that a weight of the positive electrode active material is larger than a weight of the negative electrode active material.

Here, in the present specification, an electrostatic capacitance and a capacity are defined as follows. The electrostatic capacitance of the cell shows a slope of charging curve of the cell in a unit of F (farad), and an electrostatic capacitance per unit weight of the cell is a value of the electrostatic capacitance of the cell divided by a summation of a weight of the positive electrode active material and a weight of the negative electrode active material, in a unit of F/g, the electrostatic capacitance of the positive electrode shows a cure of the charging curve of the positive electrode in a unit of F, the electrostatic capacitance per unit weight of the positive electrode is a value of the electrode capacitance of the positive electrode divided by the weight of the positive electrode active material charged into the cell in a unit of F/g, the electrostatic capacitance of the negative electrode shows a slope of the charging curve of the negative electrode in a unit of F, and the electrostatic capacitance per unit weight of the negative electrode is a value of the electrostatic capacitance of the negative electrode divided by the weight of the negative electrode active material charged into the cell in a unit of F/g.

Further, a cell capacity is a difference between a discharging initiating voltage of the cell and a discharging finish voltage, i.e., a product between an amount of the voltage change and the electrostatic capacitance of the cell, in a unit of C (coulomb), and 1 C refers to a quantity of charges in one second when a current of 1 A flows, indicated in mAh when converted in the present invention. A positive electrode capacity is a difference between the potential of the positive electrode at the time of initiating discharging and the potential of the positive electrode at the time of finishing discharging (i.e., an amount of positive electrode potential change) multiplied by the electrostatic capacitance of the positive electrode in a unit of C or mAh. Likewise, a negative electrode capacity is a difference between the potential of the negative electrode at the time of initiating discharging and the potential of the negative electrode at the time of finishing discharging (i.e., an amount of negative electrode potential change) multiplied by the electrostatic capacitance of the negative electrode in a unit of C or mAh. The cell capacity, the positive electrode capacity, and the negative electrode capacity correspond to each other.

The material having an electrostatic capacitance more than three times larger than an electrostatic capacitance per unit weight of the positive electrode active material may include, for example, PAS. The inventors found that, when discharging is conducted after 400 mAh/g of lithium ion is carried (charged) to the PAS, the electrostatic capacitance of more than 650 F/g can be obtained, and when more than 500 mAh/g of lithium ion is charged, the electrostatic capacitance of more than 750 F/g can be obtained.

The electrostatic capacitances per unit weight of the positive electrode and the negative electrode for the typical electrical double-layered capacitor are 60 to 200 F/g, and thus, it will be appreciated that the PAS has a very large electrostatic capacitance. Considering the electrostatic capacitance of the used positive electrode, a charging amount of the negative electrode is appropriately controlled to ensure the electrostatic storage of more than three times of the electrostatic storage per unit weight of the positive electrode. In addition, it is desirable that a positive electrode active material is heavier than a negative electrode active material, which is desirably the most advantageous arrangement.

Here, when the electrostatic capacitance per unit weight of the negative electrode active material is less than three times of the electrostatic capacitance per unit weight of the positive electrode active material, increase in the capacity is reduced relative to the conventional double-layered capacitor using the same amount of the active materials in the positive and negative electrodes.

In addition, even when the electrostatic capacitance per unit weight of the negative electrode active material is more than three times larger than the electrostatic capacitance per unit weight of the positive electrode active material, as in the case that the weight of the positive electrode active material is smaller than the weight of the negative electrode active material, the capacity increase is undesirably reduced relative to the conventional electrical double-layered capacitor.

The capacitor of the present invention achieves a high capacity through the following three effects.

In the first effect, by using the negative electrode active material having the electrostatic capacitance per unit weight larger than the electrostatic capacitance per unit weight of the positive electrode active material, the weight of the negative electrode active material can be reduced without changing an amount of the potential change of the negative electrode. There, a charging amount of the positive electrode active material is increased and thus the electrostatic capacitance and the capacity of the cell are increased. In another design, since the electrostatic capacitance of the negative electrode active material is large, only the potential change of the negative electrode is reduced, and consequently, an amount of the potential change of the positive electrode is increased so that the electrostatic capacitance and the capacity of the cell are increased.

In the second effect, to obtain the capacity required for a negative electrode capacity, a predetermined amount of lithium ion is carried to the negative electrode in advance, so that the potential of the negative electrode is lower than 3 V, compared to a case where the potential of the positive electrode is about 3 V, at the time that the lithium ion is carried to the negative electrode in advance.

A voltage when the voltage of the cell is increased until the electrolyte is oxidized and dissolved is determined almost by the potential of the positive electrode. Compared to a capacitor having the typical cell arrangement, the capacitor of the present invention having the lithium ion carried in advance has a higher breakdown voltage, but this is due to the low potential of the negative electrode. That is, while the use voltage of the conventional capacitor is in a range of about 2.3 to 2.7 V, the arrangement of the present invention may be in as high as more than 3 V, thus improving energy density.

Further, as the third effect, the potential of the positive electrode is lowered, and thus, the capacity of the positive electrode can be increased. With a lowered potential of the negative electrode, the amount of the potential change while charging is conducted at the positive electrode can be further increased. Depending on the design, the potential of the positive electrode is lower than 3 V at the end of discharging, and thus, for example, the discharging potential can be lowered down to 2 V (Here, the potential is lowered largely due to anion-emission for up to 3 V discharging, and due to doping of the lithium ion for less than 3 V)

In the conventional electrical double-layered capacitor, the potential of the positive electrode is lowered only down to about 3 V at the time of discharging, which is because, at this time, the potential of the negative electrode is 3 V and thus the cell voltage becomes 3 V. That is, the arrangement of the present invention where the potential of the positive electrode is lowered down to 2 V may achieve a high capacity relative to the conventional electrical double-layered capacitor where the potential of the positive electrode is lowered just to 3 V.

[I] Specific Example of Inner Arrangement

A specific example of the inner arrangement of the electrical storage device according to the present invention will now be described.

Figure 1:
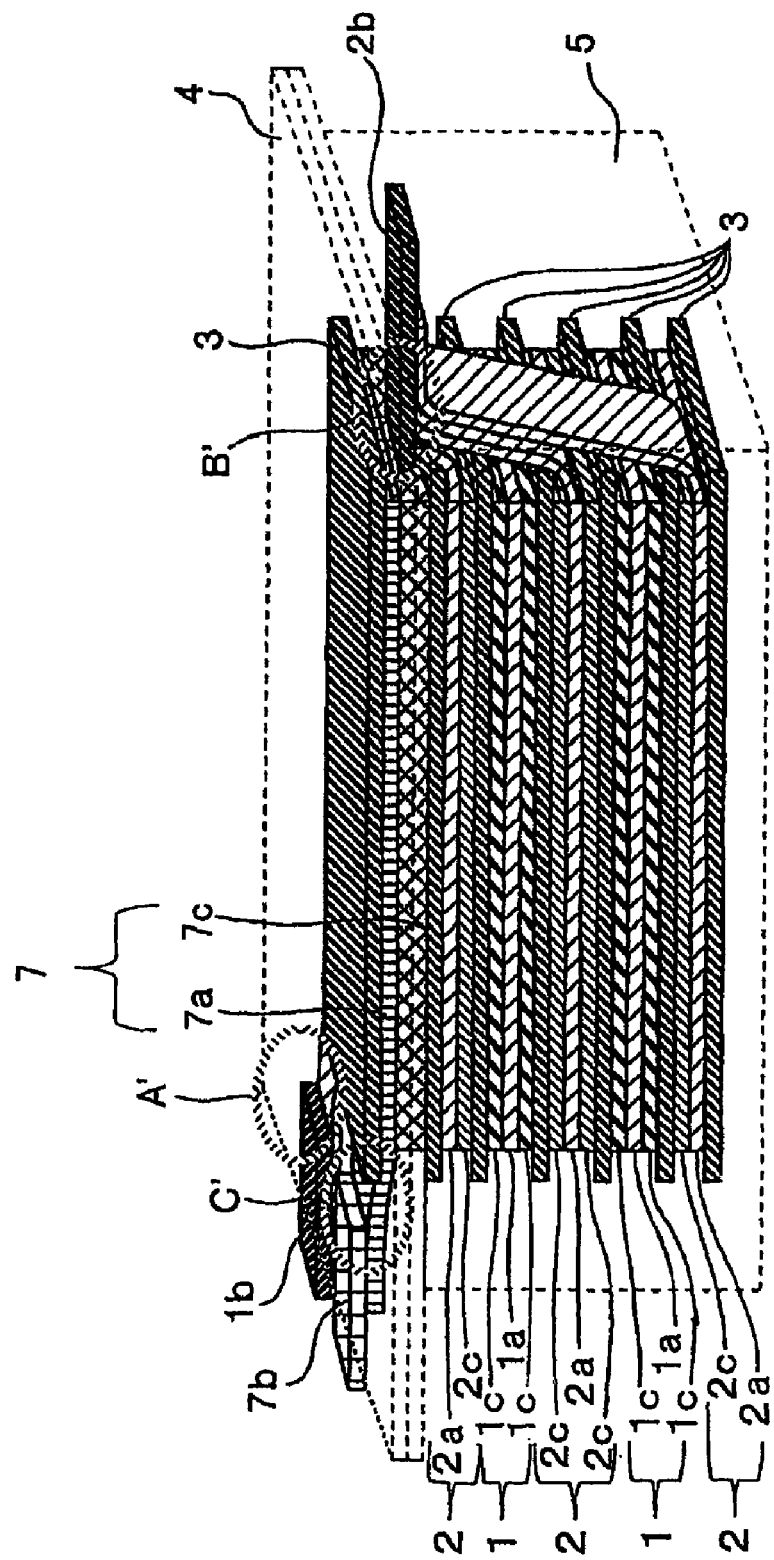
FIG. 1 is a perspective view of a first embodiment of the present invention.

Hereinafter, attached numerals will be described.

The reference numeral 1 is a positive electrode, the reference numeral 2 is a negative electrode, the reference numeral 1a is a collector (positive electrode), the reference numeral 2a is a collector (negative electrode), the reference numeral 1b is a positive electrode terminal, the reference numeral 2b is a negative electrode terminal, the reference numeral 1c is a positive electrode laminated material composed of positive electrode active material, binder and the like, the reference numeral 2c is a negative electrode laminated material composed of negative electrode active material, binder and the like, the reference numeral is a separator, the reference numeral 4 is a laminate film, the reference numeral 5 is a laminate film (deeply drawn), the reference numeral 6 is an electrode stack unit, the reference numeral 7 is a lithium electrode, the reference numeral 7a is a lithium electrode collector, the reference numeral 7b is a lithium electrode terminal, the reference numeral 7c is a lithium metal or lithium alloy, the reference numeral 8 is a three-electrode stack unit, the reference numerals 9a, 9b and 9c are wirings, and the reference numeral 10 is an electrode rolling unit. The capital letter A is a thermal connection portion between the positive electrode terminal and a outer film, the capital letter B is a thermal connection portion between the negative electrode terminal and the surface film, the capital letter C is a thermal connection portion between the lithium electrode terminal and the surface film, the capital letter D is a thermal connection portion of the surface film, the capital letter A' is a welding portion between a terminal welding portion of the positive electrode collector and the positive electrode terminal, the capital letter B' is a welding portion between a terminal welding portion of the negative electrode collector and the negative electrode terminal, the capital letter C' is a welding portion between a terminal welding portion of the lithium electrode collector and the lithium electrode terminal, and the symbol (*) shows a width of the widened electrode of the second embodiment comparing with the other Embodiments.

BEST MODE FOR CARRYING OUT THE INVENTION

First Embodiment

Figure 2:
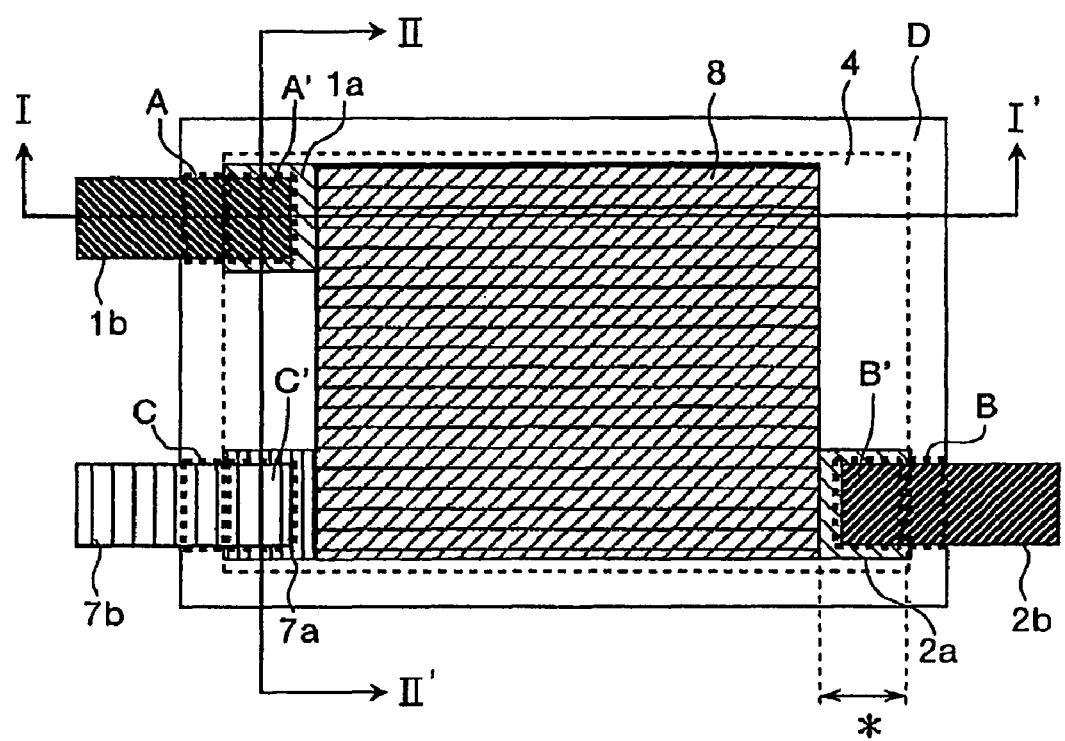
FIG. 2 is a plan view of a first embodiment of the present invention.
Figure 3:
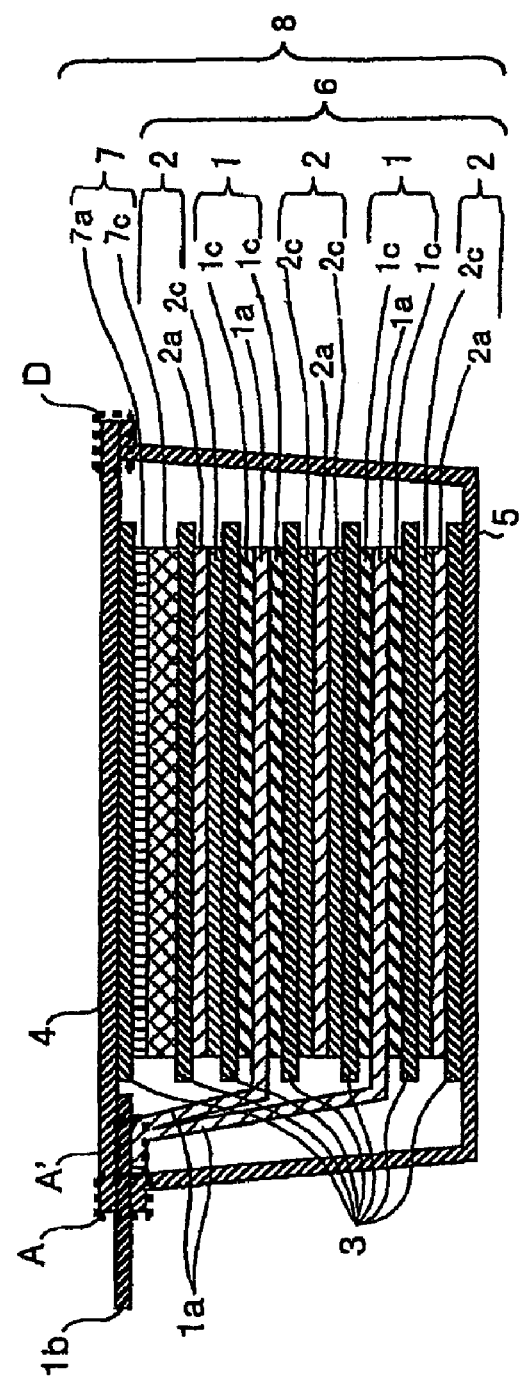
FIG. 3 is a cross-sectional view taken along I-I' of FIG. 2.
Figure 4:
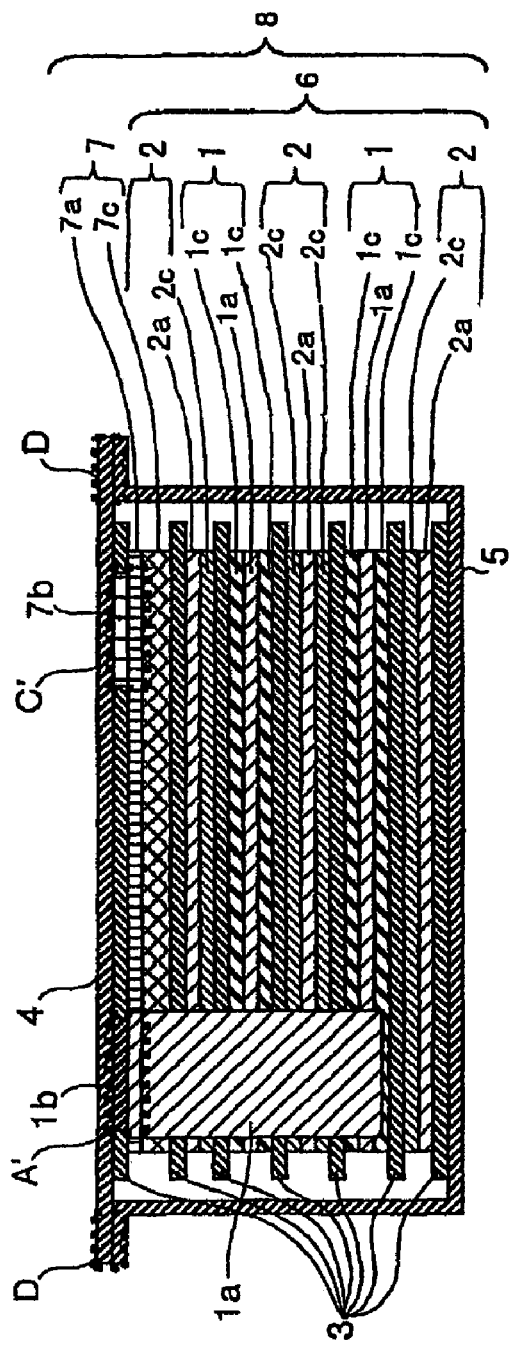
FIG. 4 is a cross-sectional view taken along II-II' of FIG. 2.

FIG. 1 is a perspective view of a first embodiment of the present invention; FIG. 2 is a plan view of a first embodiment of the present invention; FIG. 3 is a cross-sectional view taken along I-I' of FIG. 2; and FIG. 4 is a cross-sectional view taken along II-II' of FIG. 2.

In the first embodiment, a lithium electrode 7 is arranged on an electrode stack unit 6, in which an electrode couple including a positive electrode 1 and a negative electrode 2 are stacked one after another so as to form a three-electrode stack unit 8.

In the first embodiment, three sheets of negative electrode collector 2a, and two sheets of positive electrode collector 1a are used to form the electrode stack unit 6. The electrode stack unit 6 includes separators 3 between the positive electrodes and the negative electrodes in order to prevent direct contact between the positive and negative electrodes. Also, from the lower layer, there are stacked a first negative electrode collector 2a having the negative electrode arranged at the upper surface, a first positive electrode collector 1a having the positive electrodes 1 arranged at both surfaces, a second negative electrode collector 2a having the negative electrodes arranged at both surfaces, a second positive electrode collector 1a having the positive electrodes 1 arranged at both surfaces, and a third negative electrode collector 2a having the negative electrode arranged at the lower surface. In addition, a lithium electrode collector 7a having the lithium electrode 7 arranged at the lower surface is arranged on the electrode stack unit 6 with the separator 3 interposed therebetween so as to form the three-electrode stack unit 8.

In FIG. 1, the positive electrode collector 1a, the negative electrode collector 2a, and the lithium electrode collector 7a have protrusions at terminal connection portions A', B', and C', and are welded to the positive electrode terminal 1b, the negative electrode terminal 2b, and the lithium electrode terminal 7b at the terminal connection portions A', B', and C'. A shape of the protrusion that becomes the terminal welding portion is not specifically limited. It is desirable that the welding is conducted through an ultrasonic welding by binding the protrusions of several sheets of positive electrode collectors (or negative electrode collectors). According to the first embodiment, the positive electrode terminal 1b and the negative electrode terminal 2b are protruded out to opposite sides respectively, and the positive electrode terminal 1b and the lithium electrode terminal 7b are protruded out to the same side, but the locations to arrange the respective terminals are not limited thereto.

In the first embodiment, while the electrode stack unit 6 has four layers of electrode couples, each of which includes a pair of the positive electrode and the negative electrode, the layer number of the electrode couple for the electrode stack unit 6 is not specifically limited, and thus either one layer or more than two layers can be arranged. In addition, the electrode stack unit 6 may have more than two layers of electrode couple by rolling the electrode couple including a pair of the positive electrode and the negative electrode.

In addition, when the electrode stack unit 6 has at least one positive electrode and one negative electrode, the electrode stack unit 6 does not necessarily have the equal number of the positive electrode and the negative electrode. For example, it is possible to prepare one layer of common positive electrode to two or more layers of negative electrode.

Further, in the first embodiment, while the three-electrode stack unit 8 having the lithium electrode 7 arranged on a surface of the electrode stack unit 7 is illustrated, the position of the lithium electrode 7 is not limited thereto, and it may be arranged on the lowermost layer, or on the lowermost and uppermost layers, or on an intermediary layer of the electrode stack unit. For example, instead of the three-electrode stack unit 8 of the first embodiment, a three-electrode stack unit 8 having a different layer arrangement shown in FIGS. 5 to 7 may be used.

Figure 5:
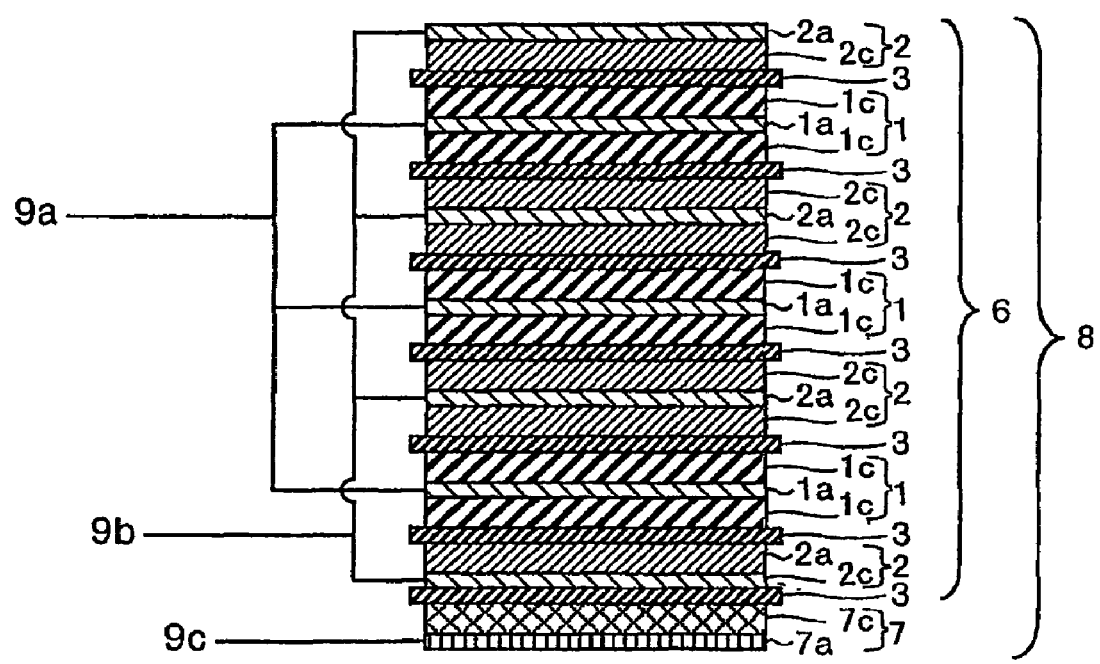
FIG. 5 is a cross-sectional view of a first example arrangement of a three-layered stack unit according to the present invention.

FIG. 5 shows another layer arrangement of the three-electrode stack unit 8. As shown in FIG. 5, the lithium electrode 7 that attaches the lithium metal to the lithium electrode collector 7a is arranged below the electrode stack unit 6, in which the positive electrode 1, the separator 3, and the negative electrode 2 are stacked one after another so as to form the three-electrode stack unit 8.

Figure 6:
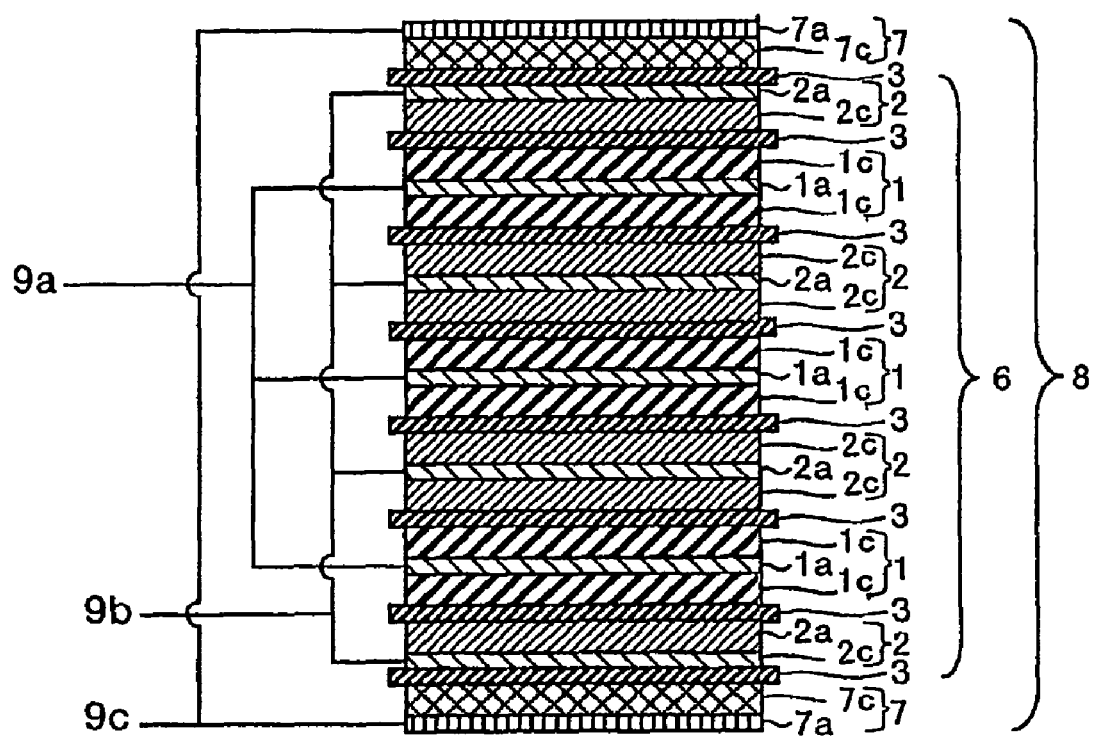
FIG. 6 is a cross-sectional view of a second example arrangement of a three-layered stack unit according to the present invention.

FIG. 6 shows another layer arrangement of the three-electrode stack unit 8. Referring to FIG. 6, the lithium electrode 9 that attaches the lithium metal to the lithium electrode collector 7a is arranged on and below the electrode stack unit 6 respectively so as to form the three-electrode stack unit 8.

Figure 7:
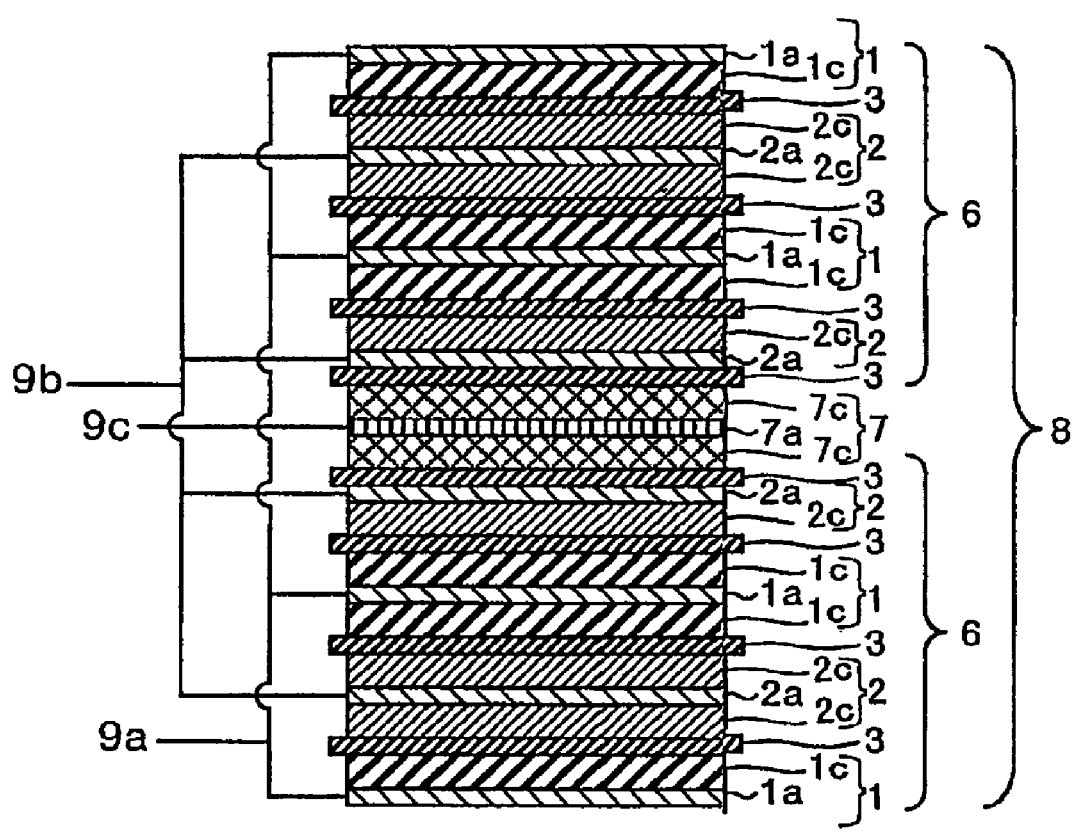
FIG. 7 is a cross-sectional view of a third example arrangement of a three-layered stack unit according to the present invention.

In addition, in another example shown in FIG. 7, the lithium electrode 7 is arranged in the very middle of the electrode stack unit 6 so as to form the three-electrode stack unit 8.

Likewise, in the stack type electrode arrangement, the arrangement position of the lithium electrode 7 can be properly changed.

Several sheets of positive electrodes 1, negative electrodes 2, and lithium electrodes 7 stacked in the three-electrode stack unit 8 shown in FIGS. 5 to 7 are bound to one and then connected to wirings 9a, 9b, and 9c. The wirings 9a, 9b and 9c, for example, are for the positive electrode terminal 1b, the negative electrode terminal 2b, and the lithium electrode terminal 7b, respectively. When each electrode is connected to the wiring, it is desirable that parts of the respective electrode collectors are bound through the ultrasonic welding.

While the lithium ions are carried to the negative electrode from the lithium electrode, for example, when −0.05 V is applied between the negative electrode and the lithium electrode through the wiring 9b and 9c, a current is flowed into the lithium electrode 7, and the lithium ions eluted out of the lithium electrode 7 is carried (doped) to the negative electrode 2. In addition, while the lithium ions are emitted from the negative electrode 2 and carried to the positive electrode 1, at the time of discharging, a current can be drawn at this time through the wirings 9a and 9b. In addition, at the time of charging, for example, when 3 V is applied between the positive electrode 1 and the negative electrode 2 through the wirings 9a and 9b, i.e., when the current is flowed into the positive electrode 1, the lithium ion carried to the positive electrode 1 are carried again to the negative electrode 2.

Second Embodiment

Figure 8:
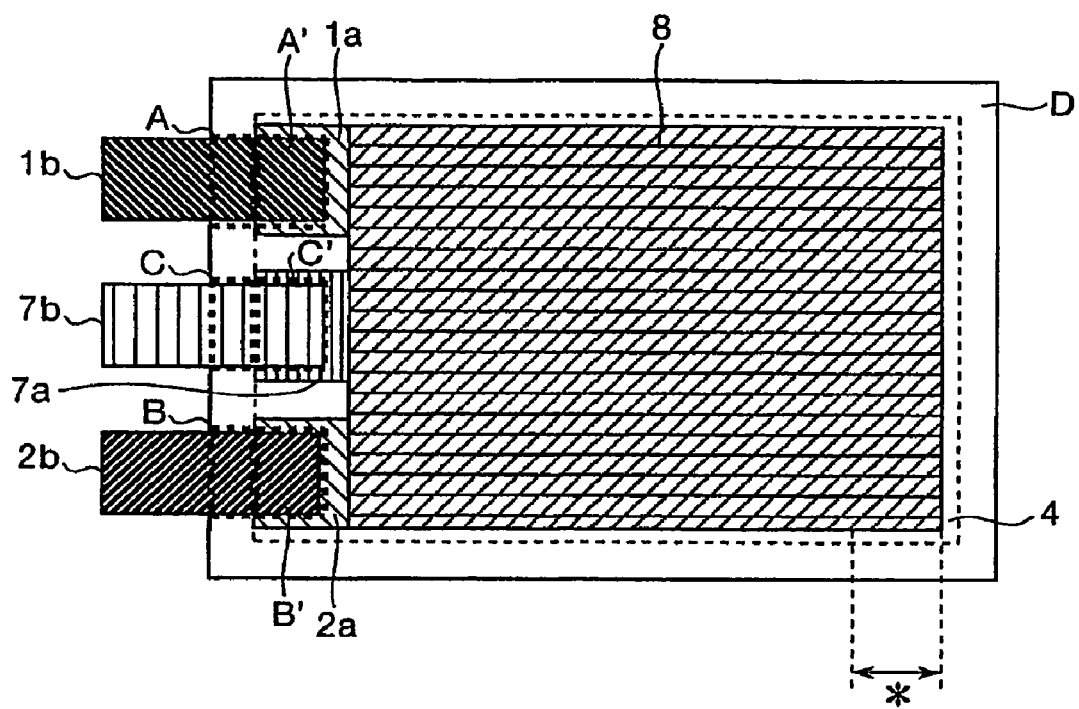
FIG. 8 is a plan view of a second embodiment of the present invention.

The second embodiment will now be described. FIG. 8 is a plan view of the second embodiment. The second embodiment has the same arrangement as in the first embodiment except that three-electrode external terminals are protruded at the same side.

Like numbers between the first and second embodiments refer to like elements, so that only different portions will be described in detail. Referring to the second embodiment, the positive electrode terminal 1b, the negative electrode terminal 2b, and the lithium electrode terminal 7b are protruded out of the same side. When the laminated film has the same size, the electrode size can be made large with the positive electrode terminal 1b, the negative electrode terminal 2b and the lithium electrode terminal 7b, so that a capacity is preferably increased. Comparing the first embodiment where the positive electrode terminal 1b, the lithium electrode terminal 7b, and the negative electrode terminal 2b are protruded at the opposite sides as shown in FIG. 2, with the second embodiment where three electrode terminals are protruded at the same sides as shown in FIG. 8, a large electrode size can be taken in the second embodiment only for a width indicated by (*).

Third Embodiment

Figure 9:
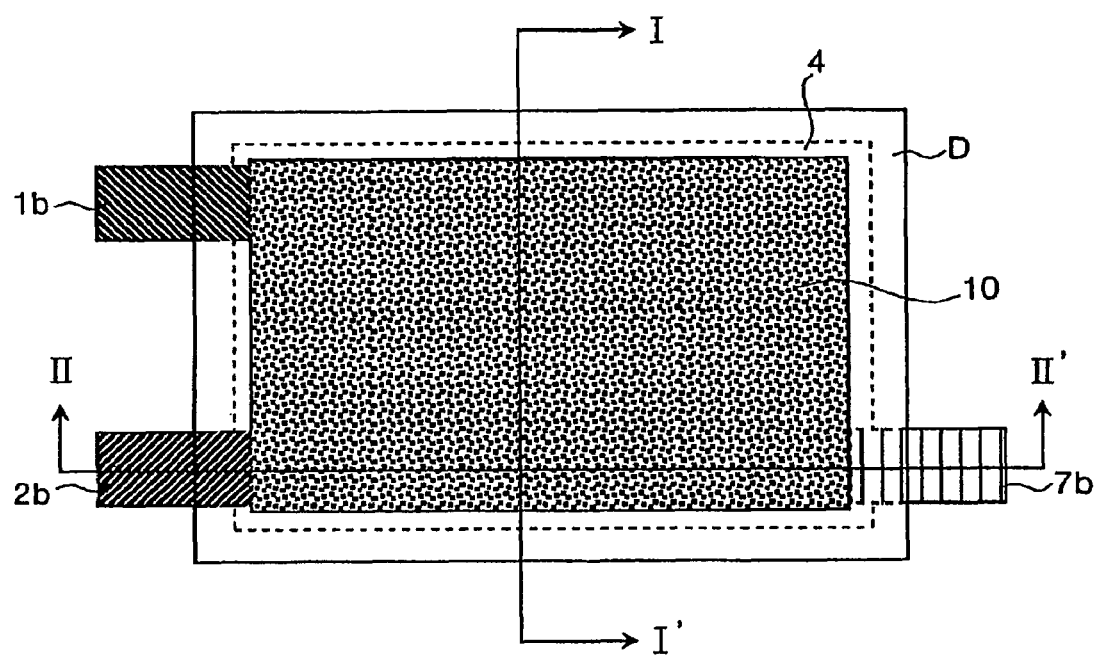
FIG. 9 is a plan view of a third embodiment of the present invention.
Figure 10:
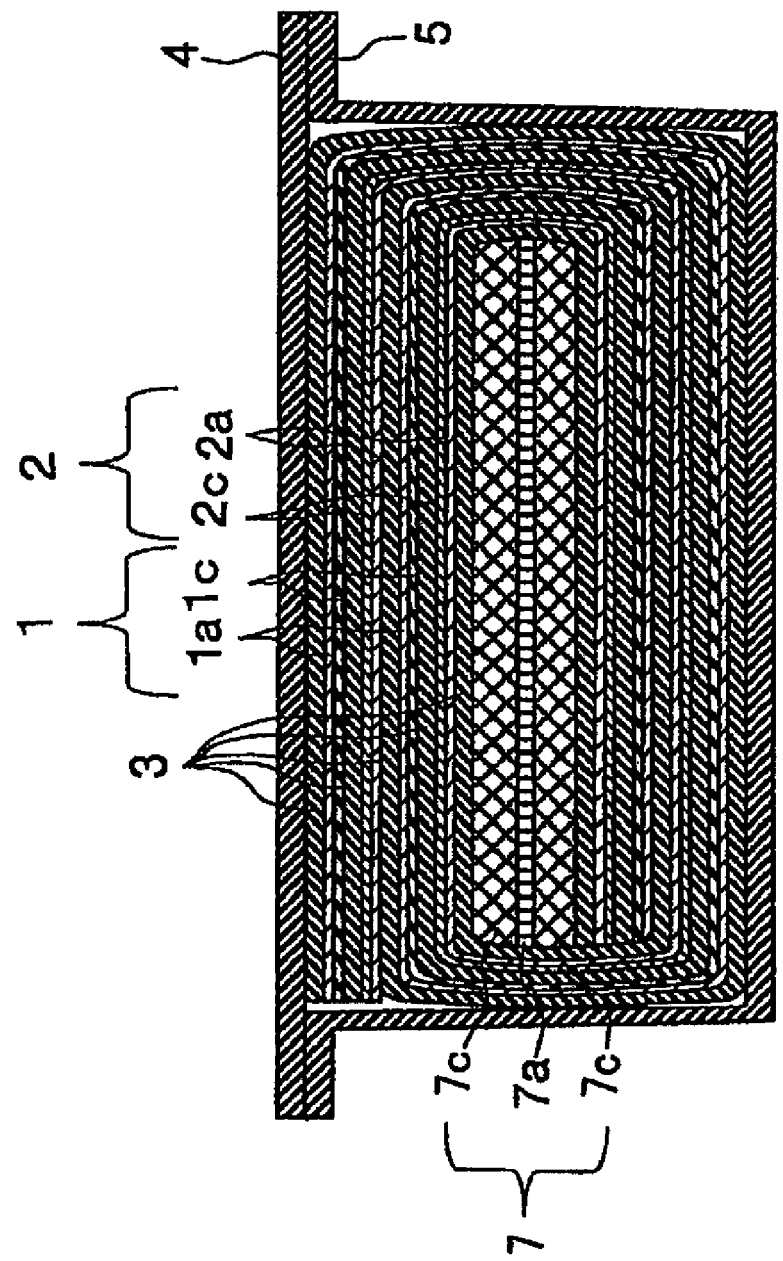
FIG. 10 is a cross-sectional view taken along I-I' line of FIG. 9.
Figure 11:
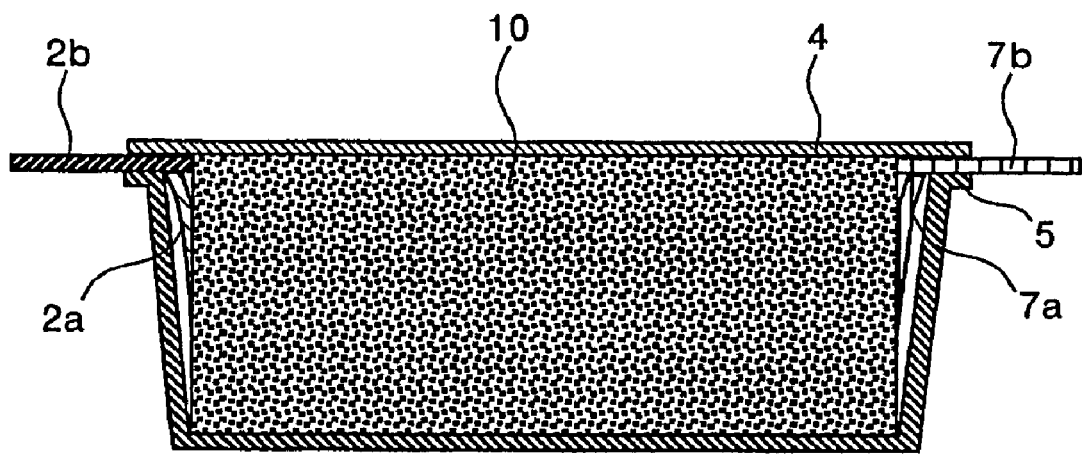
FIG. 11 is a cross-sectional view taken along II-II' line of FIG. 9.

The third embodiment will now be described. FIG. 9 is a plan view of the third embodiment. The third embodiment involves a plan view of a capacitor having an arrangement in which the plate type lithium electrode is rolled into the center. FIG. 10 is a cross-sectional view taken along an I-I' line of FIG. 9, and FIG. 11 is a cross-sectional view of II-II' line of FIG. 9. Like numbers between the first and third embodiments refer to like elements, so that only different portions will be described in detail.

In the third embodiment, the plate type lithium electrode 7 is rolled into the center as shown in FIG. 10. The lithium electrode 7 is formed on both surfaces of the lithium electrode collector 7a. The positive electrode 1 and the negative electrode 2 are formed on one surface of the ribbon type positive electrode collector 1a and negative electrode collector 2a, respectively. With a center of the lithium electrode collector 7a having the lithium electrode 7 arranged on two sides, the separator 3, the negative electrode 2, the separator 3, and the positive electrode 1 are repeatedly rolled one after another in a circular pattern, and then formed through a press.

Fourth Embodiment

Figure 12:
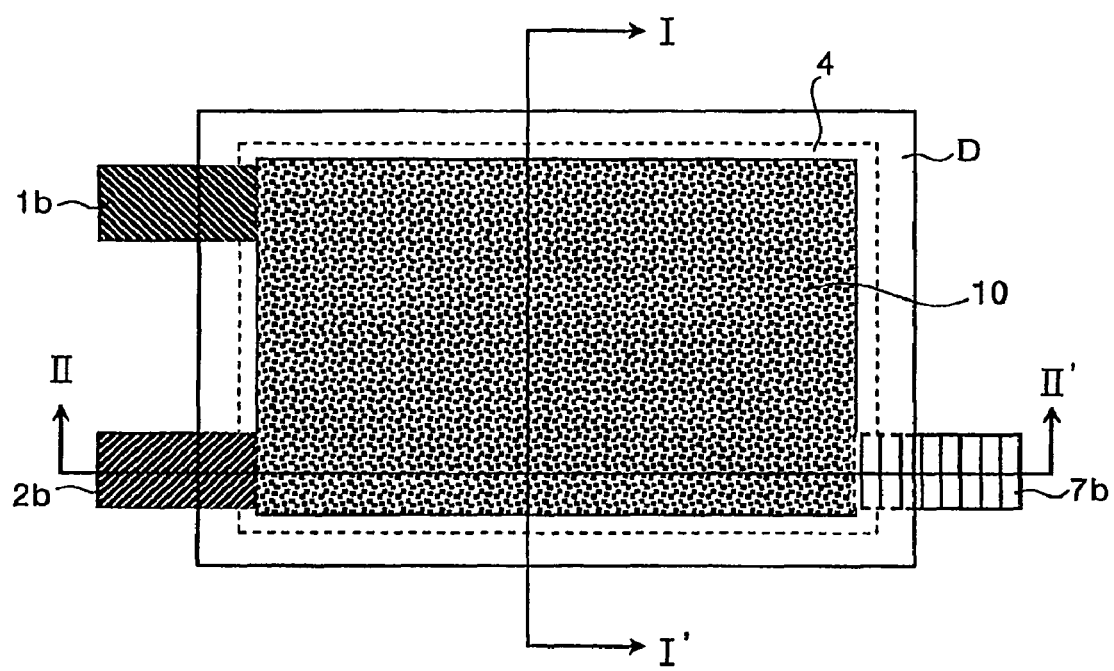
FIG. 12 is a plan view of a fourth embodiment of the present invention.
Figure 13:
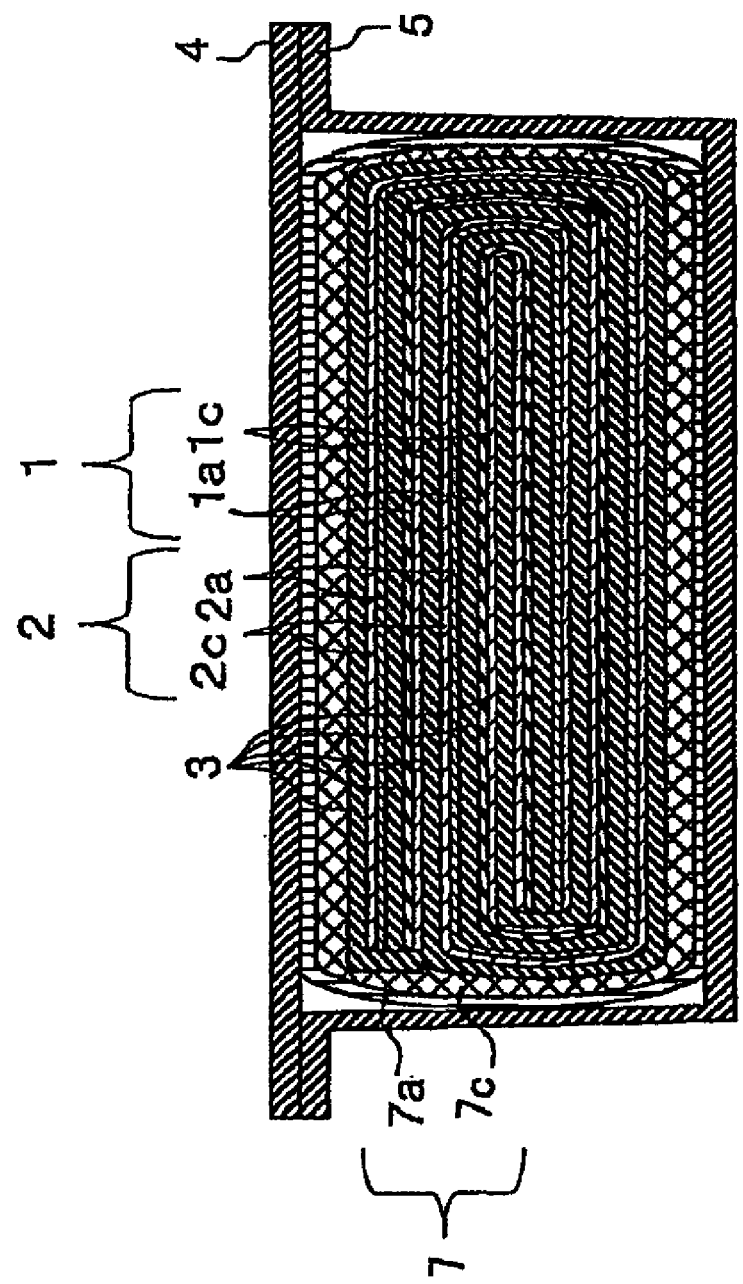
FIG. 13 is a cross-sectional view taken along I-I' line of FIG. 2.
Figure 14:
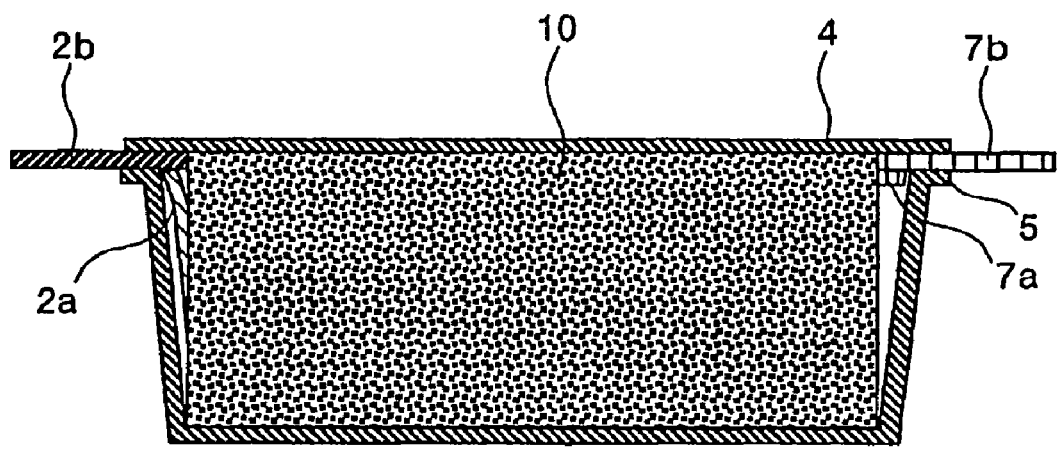
FIG. 14 is a cross-sectional view taken along II-II' line of FIG. 2.

The fourth embodiment will now be described. FIG. 12 is a plan view of the fourth embodiment. The fourth embodiment involves a plan view of a capacitor having an arrangement in which the lithium electrode 7 is rolled around the outermost perimeter. FIG. 13 is a cross-sectional view taken along I-I' line of FIG. 12, and FIG. 14 is a cross-sectional view of II-II' line of FIG. 12. Like numbers between the first and fourth embodiments refer to like elements, so that only different portions will be described in detail.

In the fourth embodiment, the lithium electrode 7 is arranged around the outermost perimeter of the electrode stack unit having a rolled arrangement. The positive electrode 1 and the negative electrode 2 are formed on one surface of the ribbon type positive electrode collector 1a and negative electrode collector 2a, respectively. In addition, the lithium electrode attaches the lithium metal 7c at one surface of the lithium electrode collector 7a. After forming the electrode stack unit having a rolled arrangement in which the separator 3, the positive electrode 1, the separator 3, and the negative electrode 2 are repeatedly rolled one after another, the lithium metal 7c side of the lithium electrode 7 that attaches the lithium metal 7c at one surface of the lithium electrode collector 7a are arranged inside and rolled around once, and then formed through a press.

[J] Electrical Storage Device Manufacturing Method

An example of manufacturing method of the electrical storage device of the present invention will now be described. First, a process of manufacturing the positive electrode, the negative electrode and the lithium electrode is described. The positive electrode is formed such that the positive electrode active material is mixed with binder resin to make slurry and the slurry is coated and dried on the positive electrode collector. In the same manner, the negative electrode is formed such that the negative electrode active material is mixed with binder resin to make slurry and the slurry is coated and dried on the negative electrode collector. The lithium electrode is formed such that the lithium metal is attached on the lithium electrode collector made of conductive porous objects.

While the thickness of each layer can be arbitrarily determined according to its use, the thickness of the negative electrode collector is, for example, 10 to 100 μm, and the thickness of the coating of the electrode active material is 50 to 300 μm for one surface. Therefore, the overall thickness of (the electrode active material+the electrode collector) things after forming the electrode is about 100 to 500 μm. In addition, the thickness of the lithium electrode collector is about 10 to 200 μm, and the thickness of the lithium metal that becomes the lithium electrode is about 50 to 300 μm.

The electrode collector that forms the electrode is dried, and then is cut to a width corresponding to the size of the outer container of the electrical storage device. When the electrode stack unit in a rolled arrangement is manufactured, it is cut in a ribbon pattern. At this time, it can be cut in a pattern having a protrusion portion as a terminal welding portion.

Figure 15:
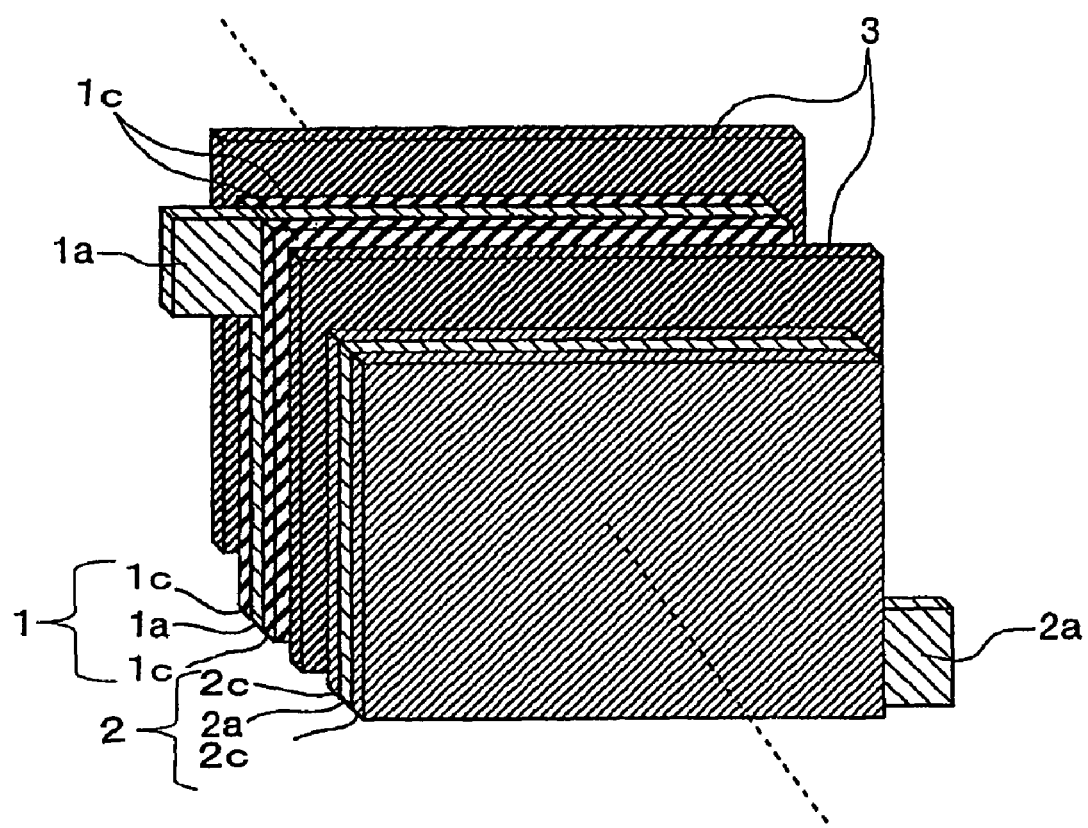
FIG. 15 is an expanded perspective view of an example electrode stack unit according to the present invention.
Figure 16:
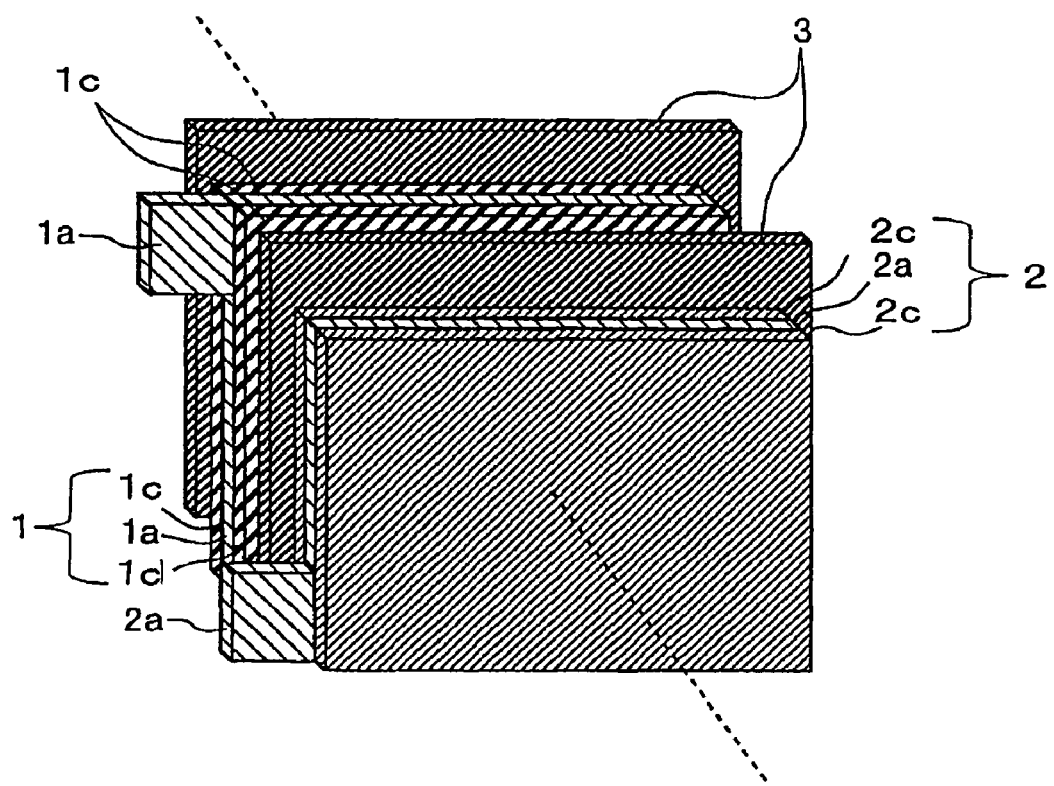
FIG. 16 is an expanded perspective view of an example electrode stack unit according to the present invention.

Next, the electrode collector that forms the electrode has a separator interposed between the positive electrode, the negative electrode, and the lithium electrode not to directly contact with each other so as to form the three-electrode stack unit. FIGS. 15 and 16 are expanded diagrams of an electrode stack unit, in which the shape of the terminal welding portion is shown in the stacked direction. FIG. 15 shows an example in which the terminal welding portion of the positive electrode and the terminal welding portion of the negative electrode are protruded out of the opposite sides respectively, and FIG. 16 shows an example in which the terminal welding portion of the positive electrode and the terminal welding portion of the negative electrode are protruded out of the same side. However, the directions of terminals of the positive and negative electrodes are not limited to the above two types.

The terminal welding portion of the positive electrode collector of the assembled three-electrode stack unit is welded into the positive electrode terminal, the terminal welding portion of the negative electrode collector to the negative electrode terminal, and the terminal welding portion of the lithium electrode collector to the lithium electrode terminal respectively, through the ultrasonic welding.

The three-electrode stack unit welded to the external terminal is arranged in the outer container, and an electrolyte inlet is left and the outer container is closed through heat sealing. At this time, at least the part of the external terminal is exposed to the outside of the outer container in order to connect with the external circuit. The electrolyte is injected from the electrolyte inlet of the outer container, and the outer container is filled with the electrolyte. Then, the electrolyte inlet is closed through heat sealing to fully seal the outer container, so that electrical storage device of the present invention can be obtained.

In the electrical storage device of the present invention described above, the lithium ion can be carried to the negative electrode by flowing current between the lithium electrode and the negative electrode through the lithium electrode terminal and the negative electrode terminal, for example. With −0.05 V applied between the negative electrode and the lithium electrode (a current flowed from the external circuit to the lithium electrode), the lithium ion is transferred from the lithium electrode through the electrolyte, and carried to the negative electrode. At this time, under a state where the positive and negative electrodes are planarized due to a vice and so on, when the lithium ion is carried to the negative electrode, the negative electrode is hardened while keeping the flatness. Thus, there is no shape-change of a cell itself, which preferably improves the cell performance. A timing to carry the lithium to the negative electrode is not specifically limited, but when the electrical storage device is charged before carrying the lithium to ion the negative electrode, the electrolyte may be dissolved due to a high potential of the positive electrode. Thus, it is desirable that the negative electrode terminal and the lithium electrode terminal are shirt-circuit before charging the electrical storage device.

When the lithium ion is carried to the negative electrode from the lithium electrode, the lithium metal of the lithium electrode is gradually reduced, but when a part of the lithium metal of the lithium electrode exists after carrying the lithium ion to the negative electrode, it is possible to use the remaining lithium electrode of the lithium metal in order to check the potential of the positive or negative electrode as a reference electrode.

That is, for example, when the potential of the negative electrode is lower than 0 V, the lithium metal may be electrocrystallized on the negative electrode surface. Thus, there needs a careful attention to determine a charging condition. Regarding this, according to the present invention, the electrical storage device that can use the lithium electrode as a reference electrode can determine the potential of the negative electrode at the time of charging, so that it is possible to control the potential of the negative electrode to be lower than 0 V for a charging process.

In addition, according to the present invention, after checking the potential of the negative electrode and measuring the cell capacity, O V is applied between the negative electrode terminal and the lithium electrode terminal to the lithium metal that exists in the lithium electrode through a potentiogalvanostat, and a proper amount per unit weight of the negative electrode active material is carried again so that the electrical storage device can be regenerated to the capacity before testing the electrical storage device under a high temperature load.

EXAMPLES

Examples 1 to 3, Comparative Examples 1 and 2

Manufacturing Method of Negative Electrode

A phenol resin formation plate having a thickness of 0.5 mm is put into a siliconit electric furnace, and annealed up to 500° C. at a rate of 50° C./hr under the nitrogen atmosphere, and further up to 650° C. at a rate of 10° C./hr so as to synthesize PAS. The above PAS plate is ground with a disk mill to obtain the PAS powder. The PAS powder has an H/C ratio of 0.22.

Next, 100 parts by weight of the PAS power is sufficiently mixed with a solution, in which 10 parts by weight of the polyvinylidene power is dissolved in 120 parts by weight of an N-methylpyrrolidone, so as to obtain slurry. The slurry is coated and dried on both surfaces of a copper expanded metal having a thickness of 40 μm (porosity of 50%), which is pressed to obtain a PAS negative electrode having a thickness of 200 μm.

(Manufacturing Method of Positive Electrode)

A phenol resin formation plate having a thickness of 0.5 mm is put into a Siliconit electric furnace, and annealed up to 500° C. at a rate of 50° C./hr under the nitrogen atmosphere, and further up to 650° C. at a rate of 10° C./hr so as to synthesize PAS. The above PAS plate is activated by water vapor, and then ground with a nylon ball mill to obtain the PAS powder. The PAS powder has a BET specific surface area of 1500 m$^2$/g, and an H/C ratio of 0.10 from the element analysis.

100 parts by weight of the PAS power are sufficiently mixed with a solution, in which 10 parts by weight of the polyvinylidene power is dissolved in 100 parts by weight of an N-methylpyrrolidone, so as to obtain slurry. The slurry is coated and dried on both surfaces of an aluminum expanded metal having a thickness of 40 μm (porosity of 50%), which is pressed to obtain a PAS positive electrode having a thickness of 380 μm.

(Measuring Electrostatic Capacitance Per Unit Weight of Negative Electrode)

The negative electrode is cut into four pieces having a size of 1.5×2.0 cm$^2$ to obtain sample negative electrodes. As a counter electrode to the negative electrode, the metal lithium having a size of 1.5×2.0 cm$^2$, and a thickness of 200 μm is stacked with polyethylene non-woven fabrics having a thickness of 50 μm as a separator to assemble a sample cell. The metal lithium is used as a reference electrode. 1 mol/l LiPF$_6$ solution, which include LiPF$_6$ dissolved in propylene carbonate, is used as the electrolyte. The weight of the negative electrode active material is charged with 400 mAh/g of lithium ion in a charging current of 1 mA, and then discharges at 1 mA until the voltage becomes 1.5 V. The electrostatic capacitance per unit weight of the negative electrode extracted from a discharging time while the potential varies from that of one minute after the beginning of the discharge to 0.2 V is 653 F/g.

(Measuring Electrostatic Capacitance Per Unit Weight of Positive Electrode)

The positive electrode is cut into three pieces having a size of 1.5×2.0 cm$^2$, and these pieces are used for the positive electrode, the negative electrode and a reference electrode. A sample cell of the capacitor is assembled by interposing polyethylene non-woven fabric having a thickness of 50 μm between the positive and negative electrodes as a separator. 1 mol/l triethylmethylammonium tetrafluoroborate (TEMA BFO solution, which includes TEMA BF$_4$ dissolved in propylene carbonate, is used as a positive electrode electrolytic solution. The sample cell is charged by a charging current of 10 mA until the voltage becomes 2.5 V, and then a static voltage charging is performed. After one hour of charging time, the sample cell discharges at 1 mA until the voltage becomes 0 V. The electrostatic capacitance per unit weight of the cell extracted from a discharging time while the potential varies between 2.0 to 1.5 V is 21 F/g. In addition, the electrostatic capacitance per unit weight of the positive electrode extracted in the same manner from the potential difference between the reference and positive electrodes is 85 F/g.

(Forming Electrode Stack Unit 1)

The PAS negative electrode having a thickness of 200 μm and the PAS positive electrode having a thickness of 380 μm are cut into pieces having sizes of 5.0×7.0 cm$^2$ (not including the area of the terminal welding portion) and the shape of FIG. 15. A cellulose/rayon combined non-woven fabric having a thickness of 25 μm is used as a separator, the terminal welding portions of the positive electrode collector and the negative electrode collector are arranged at the opposite sides as shown in FIG. 15, and the counter surfaces of the positive and negative electrodes are stacked in 10 layers. The separators are arranged in the uppermost and lowermost portions, and four sides are sealed with tapes. The terminal welding portion of the positive electrode collector (five sheets) and the terminal welding portion of the negative electrode collector (six sheets) are ultrasonic welded to an aluminum positive electrode terminal and a Ni negative electrode terminal having a width of 20 mm, a length of 50 mm, and a thickness of 0.1 mm so as to obtain the electrode stack unit 1. Further, five sheets of the positive electrode and six sheets of the negative electrode are used, and one of two sheets of the negative electrode formed on both surfaces of each of the negative electrodes at the outermost sides is removed as shown in FIG. 1. The thickness is 120 μm. The weight of the positive electrode active material is 1.7 times larger than the weight of the negative electrode active material.

(Forming Electrode Stack Unit 2)

The PAS negative electrode having a thickness of 200 μm and the PAS positive electrode having a thickness of 380 μm are cut into pieces having sizes of 5.0×8.0 cm$^2$ (not including the area of the terminal welding portion) and the shape of FIG. 16. The electrode stack unit 2 is obtained in the same manner as the electrode stack unit 1 except that the terminal welding portion of the positive electrode collector and the negative electrode collector are arranged at the same side.

(Forming Cell 1)

As shown in FIG. 1, a layer of lithium metal foils (160 μm, 5.0×7.0 cm$^2$) pressed on a stainless net having a thickness of 80 μm is used as the lithium electrode in an outer film drawn as deep as 3.5 mm, and arranged at the opposite side of the negative electrode on the electrode stack unit 1 so as to obtain a three-electrode stack unit. Further, a Ni-made lithium electrode terminal having a width of 10 mm, a length of 50 mm, and a depth of 0.1 mm is ultrasonic welded to the terminal welding portion (one sheet) of the lithium electrode collector, and arranged to face the same orientation of the positive electrode terminal as shown in FIG. 1.

The three-electrode stack unit is arranged in the drawn outer film, and covered with the outer laminated film. Three sides are sealed, and then 1 mol/l LiPF$_6$ solution, which includes LiPF$_6$ dissolved in a mixed solvent of ethylene carbonate, diethyl carbonate, and propylene carbonate in a weight ratio of 3:4:1, is impregnated under vacuum state into the unit as the electrolyte. After that, the remaining side is sealed, and the film type capacitor is assembled into eight cells. The negative electrode terminal and the lithium electrode terminal are made short-circuit immediately after assembling.

(Forming Cell 2)

In the same manner as the first cell, a layer of lithium metal foils (160 μm, 5.0×8.0 cm$^2$) pressed on a stainless net having a thickness of 80 μm is used as the lithium electrode, and arranged at the opposite side of the negative electrode on the electrode stack unit 2 so as to obtain the three-electrode stack unit. However, the positive electrode, the negative electrode and the lithium electrode terminal face the same directions as shown in FIG. 5. The three-electrode stack unit is arranged in the deeply drawn outer film, and the film type capacitor is assembled into eight cells like the forming of the cell 1. The negative electrode terminal and the lithium electrode terminal are made short-circuit immediately after assembling.
(Forming Cell 3)

In the same manner as the first cell, the film type capacitor is assembled into eight cells. Immediately after assembling, −0.05 V is applied between the negative electrode terminal and the lithium electrode terminal through a potentiogalvanostat.
(Forming Cell 4)

The film type capacitor is assembled into eight cells in the same manner as the forming of the cell 1 except that the terminal welding portion of the lithium electrode collector (one sheet) and the terminal welding portion of the negative electrode collector (six sheets) are ultrasonic welded to each other, the negative electrode is short-circuited with the lithium electrode in the cell, and the Ni negative electrode terminal having a width of 10 mm, a length of 50 mm, and a thickness of 0.1 mm is ultrasonic welded.
(Forming Cell 5)

The film type capacitor is assembled into eight cells in the same manner as the forming of the cell 2 except that the terminal welding portion of the lithium electrode collector (one sheet) and the terminal welding portion of the negative electrode collector (six sheets) are ultrasonic welded to each other, the negative electrode is short-circuited with the lithium electrode in the cell, and the Ni negative electrode terminal having a width of 10 mm, a length of 50 mm, and a thickness of 0.1 mm is ultrasonic welded.
(Initial Estimation of Cell)

On three days after assembling the cells 1 to 5, one from the respective cells is disassembled. It is found that the lithium metal of the cell 3 totally disappears, from which it is determined that the lithium ion for obtaining 650 F/g of electrostatic capacitance per unit weight of the negative electrode active material is preliminarily charged. For the remaining cells 1, 2, 4, and 5, the lithium metal is left.

On seven days after assembling the cells, one of the respective cells is disassembled. It is found that the lithium metal in all cells totally disappears, from which it is determined that the lithium for obtaining 650 F/g of electrostatic capacitance per unit weight of the negative electrode active material is preliminarily charged for all cells.

When the lithium ion is carried to the negative electrode using the external circuit, a minus voltage is applied between the negative electrode terminal and the lithium electrode terminal, thereby a speed to carry can be accelerated. However, when the applied minus voltage is too high, the lithium metal may be electro-crystallized on the negative electrode surface, thereby the attention should be paid to.
(Cell Characteristic Estimation)

After measuring thickness of the cells 1 to 5 with micrometer, the cells are charged by a constant current of 1000 mA until the voltage becomes 3.3 V, and then the constant current and constant voltage charging applying a constant voltage of 3.3 V is performed for one hour. Next, the cell discharges at a constant current of 100 mA until the voltage becomes 1.6 V. The cell capacity and the energy density are estimated after repeating 3.3-1.6 v cycles three times. In addition, at the fourth time of discharging, the cell discharges 10 A, and the direct current resistance of the cell is measured from IR drop immediately after discharging. The results are shown in Table 1. The data are average values of six cells.

TABLE 1

| Example No. | Cell thickness (mm) | Cell Capacitance (mAh) | Energy density (Wh/l) | DC resistance (mΩ) |
|---|---|---|---|---|
| Example 1 (Cell 1) | 3.82 | 91 | 15 | 25.6 |
| Example 2 (Cell 2) | 3.85 | 102 | 16 | 23.0 |
| Example 3 (Cell 3) | 3.83 | 92 | 15 | 26.1 |
| Comparative Example 1 (Cell 4) | 4.05 | 90 | 15 | 29.8 |
| Comparative Example 2 (Cell 5) | 4.11 | 101 | 16 | 28.2 |

Even when the size of the film battery appearance is equal, the filling ratio of the active material varies with how to install the terminals, and thus differences of the capacity and energy density are induced. It is preferable that the terminals be arranged at the same side like the cell 2 or 5 since the terminals can have higher capacity with the above structure.

In addition, the cells 1 to 3, which carry lithium ion through the external circuit, have flat cell surfaces and low DC internal resistances, however, the cells 4 and 5, in which short-circuits are made, are warped to the cell surfaces, and distortions are induced, thereby the average cell thickness is higher for the cells 1 to 3. In particular, the electrode edge portions are distorted a lot. Further, the DC internal resistance is larger than those of the cell 1 to 3.

Comparative Example 3

Except that the lithium ion is not carried to the negative electrode, six cells are assembled in the same manner as the first example.

The six cells are charged by a constant current of 1000 mA until the cell voltage becomes 3.3 V, and then the constant current and constant voltage charging applying 3.3 V is performed for one hour. Next, the cell discharges at a constant current of 100 mA until the cell voltage becomes 1.6 V. After repeating the cycle of 3.3-1.6 V three times, the cell capacity is estimated to be 30 mAh (average of six cells). The energy density of the capacitor is 4.5 Wh/l, that is, less than 10 Wh/l. When the lithium ion is not carried to the negative electrode, a sufficient capacity cannot be obtained.

Comparative Example 4

Except that the aluminum foil having a thickness of 20 μm is used in the positive electrode collector and that the copper foil having a thickness of 20 μm is used in the negative electrode collector, 7 cells are assembled in the same manner as the first example. Right after assembling, the negative electrode terminal and the lithium electrode terminal are short-circuited. After leaving them at the room temperature for 20 days, one cell is disassembled, in which the most lithium metal is left.

The remaining six cells are charged by a constant current of 1000 mA until the battery voltage becomes 3.3 V, and then the constant current and constant voltage charging applying 3.3 V is performed for one hour. Next, the cell discharges at a constant current of 100 mA until the cell voltage becomes 1.6 V. After repeating the cycle of 3.3-1.6 V, the cell capacity is estimated to be 32 mAh (average of six cells). The energy density of the capacitor is 4.8 Wh/l, that is, less than 10 Wh/l.

When metal foils (porosity 0%) are used in the collectors, and the lithium ion electrode is arranged to face the negative electrode, the lithium ion cannot be carried to the negative electrode, and sufficient capacity cannot be obtained.

Example 4

Except that the lithium metal foil of 320 μm is used as a lithium electrode, seven cells are assembled in the same manner as the first example. After assembling, 0 V is applied between the negative electrode terminal and the lithium electrode terminal under a constant voltage condition by a potentiogalvanostat (manufactured by Hokuto Denko Corporation, HA-301), a current flowing between the negative electrode and the lithium electrode is accumulated by a coulomb/ampere-hour meter (manufactured by Hokuto Denko Corporation, HF-201), and the carry of lithium ion is finished when the accumulated amount of current becomes 400 mAh/g per unit weight of the negative electrode active material, thereby, the lithium ion for obtaining 650 F/g of electrostatic capacitance per unit weight of the negative electrode active material is preliminarily charged. After finishing preliminary charging of the lithium ion, one cell is disassembled. Here, it is found that about a half the initial thickness of the lithium metal foil is left.

In addition, the potential difference between the negative electrode and the lithium electrode of the remaining six cells is measured to be around 0.25 V, therefore, it could be verified that all of six cells are preliminarily charged with lithium ion.

When the lithium ion is carried to the negative electrode through the external circuit, the carry amount could be controlled to the lithium metal foil prepared in the cell by using the coulomb/ampere-hour meter and the like. That is, the lithium ion carry amount of the negative electrode becomes 400 mAh/g by supplying the lithium ion from the lithium electrode to the negative electrode.

The remaining six cells are charged by a constant current of 1000 mA until the battery voltage becomes 3.3 V, and then the constant current and constant voltage charging applying 3.3 V is performed for one hour. Next, the cell discharges at a constant current of 100 mA until the cell voltage becomes 1.6 V. After repeating the cycle of 3.3-1.6 V, the cell capacity is estimated to be 91 mAh (average of six cells). The energy density of the capacitor is 15 Wh/l.

For the above-mentioned charging process, it is found by using the lithium electrode as a reference electrode that the potential of the negative electrode is 0.18 V, that is, the potential does not drop below 0 V. When the potential of the negative electrode is less than 0 V, the lithium metal may be electro-crystallized on the surface of the negative electrode. Therefore, the attention should be paid to determine the charging conditions. However, since the electrical storage device according to the example is capable of using the lithium electrode as a reference electrode, the potential of the negative electrode at the time of charging can be verified, thereby it is preferable.

Example 5

Except that a lithium electrode such as the lithium electrode using the lithium metal foil of 160 μm is arranged at the lower portion of the electrode stack unit 1, and used as a reference electrode, seven cells are assembled in the same manner as the first example. Further, contrary to the lithium electrode, the terminal of the reference electrode is arranged in the same side of the negative electrode terminal. Right after assembling, the negative electrode terminal and the lithium electrode terminal are short-circuited.

On seven days after assembling the cells, one cell is disassembled. It is found that the lithium metal totally disappeared, from which it is determined that the lithium ion for obtaining 650 F/g of electrostatic capacitance per unit weight of the negative electrode active material is preliminarily charged.

Further, for the remaining six cells, the potential difference between the negative electrode and the reference electrode is measured to be 0.25 V, thereby it could be determined that all six cells are preliminarily charged with lithium ion.

The remaining six cells are charged by a constant current of 1000 mA until the battery voltage becomes 3.3 V, and then the constant current and constant voltage charging applying 3.3 V is performed for one hour. Next, the cell discharges at a constant current of 100 mA until the cell voltage becomes 1.6 V. After repeating the cycle of 3.3-1.6 V, the cell capacity is estimated to be 91 mAh (average of six cells). The energy density of the capacitor is 15 Wh/l.

In the above-mentioned charging process, it is found by using the reference electrode that the potential of the negative electrode is 0.18 V, that is, the potential does not drop below 0 V. When the potential of the negative electrode is less than 0 V, the lithium metal may be electro-crystallized on the surface of the negative electrode. Therefore, the attention should be paid to determine the charging conditions. While it is preferable to have a reference electrode like the present example, since the potential of the negative electrode can be checked at the time of charging, it is also preferable to arrange more lithium metal than that required for preliminary charging, since remaining lithium metal after the completion of preliminary charging can be used as the reference electrode, thereby the structure of the cell becomes simple.

Example 6

The six cells, the capacities of which are measured in the Example 4, are charged by a constant current of 1000 mA until the cell voltage becomes 3.3 V, the six cells are moved to a constant temperature tube of 60° C., and then 3.3 V is continuously applied for 2000 hours to the cells to perform a high temperature load test. After the test, the cell capacity is estimated, the same as the capacity measurement after assembly, to be 82 mAh (average of six cells). After the cell capacity measurement, 0 V is applied between the negative electrode terminal and the lithium electrode terminal by a potentiogalvanostat, a flowing current is accumulated with a coulomb meter, and the carry of lithium ion is finished when the accumulated amount of current becomes 50 mAh/g per unit weight of the negative electrode active material, and the cell capacity is measured to be back to the capacity before the high temperature load test, that is, 91 mAh (average of six cells).

A using method of supplying the proper lithium ion from the lithium electrode to the electrical storage device, characteristics of which deteriorate is preferable for long-term use of the electrical storage device as described in the present example.

Example 7

100 parts by weight of $LiCoO_2$ power having a diameter of 5 to 10 μm, 5 parts by weight of graphite, are sufficiently mixed with a solution, in which 3.5 parts by weight of polyvinylidene powder is dissolved in 50 parts by weight of an N-methylpyrrolidone in order to obtain slurry. The slurry is coated on both surfaces of an aluminum expanded metal coated with a carbon group conductive pigment of a thickness of 40 μm (porosity 50%) and a front and rear surfaces of the aluminum foil of thickness of 20 μm, and dried and pressed so as to obtain the $LiCoO_2$ positive electrodes 1 and 2 of a thickness of 285 μm.

Except that a copper expanded metal having a thickness of 40 μm (porosity 50%) is replaced with the copper foil of 20 μm, the PAS negative electrode is obtained in the same manner as the manufacturing method of the negative electrode of the example 1.

(Forming Cell 6)

The same PAS negative electrode and $LiCoO_2$ positive electrode as the first example are cut into pieces having the shape of FIG. 15 and a size of 5.0×7.0 $cm^2$ (not including the area of the terminal welding portion), and cellulose/rayon combined non-woven fabrics having a thickness of 25 μm are used as a separator. As shown in FIG. 15, the terminal welding portions of the positive electrode collector and the negative electrode collector are arranged at the opposite sides, and the counter surfaces of the positive and negative electrodes are stacked in ten layers. The positive and negative electrode collectors have openings that penetrate the front and rear surfaces of the collectors. The separators are arranged at the uppermost and lowermost portions, and then four sides are sealed with tapes. The terminal welding portion of the positive electrode collector (five sheets) and the terminal welding portion of the negative electrode collector (six sheets) are ultrasonic welded to an aluminum positive electrode terminal and a Ni negative electrode terminal having a width of 20 mm, a length of 50 mm, and a thickness of 0.1 mm so as to obtain the electrode stack unit 3.

A layer including lithium metal foils (220 μm, 5.0×7.0 $cm^2$) pressed on a stainless net having a thickness of 80 μm is arranged on the electrode stack unit 3 as the lithium electrode to face the negative electrode in an outer film drawn as deep as 3.5 mm like FIG. 1 to obtain the three-electrode stack unit. Further, a Ni-made lithium electrode terminal having a width of 10 mm a length of 50 mm, and a depth of 0.1 mm is ultrasonic welded to the (one sheet) terminal welding portion of the lithium electrode collector, and arranged to face the same orientation of the positive electrode terminal as shown in FIG. 1.

The three-electrode stack unit is arranged in the drawn outer film, and covered with the outer laminated film. Three sides of the film are sealed, and 1 mol/l $LiPF_6$ solution, which includes $LiPF_6$ dissolved in a mixed solvent of ethylenecarbonate, diethylencarbonate, and propylenecarbonate in a weight ratio of 3:4:1, is impregnated in a vacuum as the electrolyte. The remaining side is sealed, and then a cell of the film type capacitor is assembled. After the assembly, 0 V is applied between the negative electrode terminal and the lithium electrode terminal through a potentiogalvanostat, a flowing current is accumulated with a coulomb/ampere hour meter, and the carry of lithium ion is finished when the accumulated amount of current becomes 300 mAh/g per unit weight of the negative electrode active material, thereby a preliminary charging is made.

(Forming Cell 7)

As a counter electrode to the PAS negative electrode using the copper foil, six sample cells, in which stainless meshes having metal lithium of a thickness of 160 μm and a size of 5.0×7.0 $cm^2$ attached thereto are stacked with polyethylene non-woven fabrics having a thickness of 50 μm interposed therebetween as separators, are assembled. The metal lithium is used as a reference electrode. 1 mol/l $LiPF_6$ solution, which includes $LiPF_6$ dissolved in a mixed solvent of ethylene carbonate, diethyl carbonate, and propylene carbonate in a weight ratio of 3:4:1, is used as the electrolyte.

After the weight of the negative electrode active material is charged with 300 mAh/g of lithium ion, a sample cell is disassembled to obtain six sheets of PAS negative electrode carrying the lithium ion.

Except that the lithium ion carrying PAS negative electrode (six sheets) and the $LiCoO_2$ negative electrode 2 (five sheets) are used, the film type capacitor is assembled to one cell in the same manner as the cell 6. However, after assembling, the preliminary charging manipulation of the lithium ion in the negative electrode is not performed. Further, both the positive electrode collector and the negative electrode collector have foils that do not have openings.

(Measuring the Potentials of Positive and Negative Electrodes in Discharging)

Cells 6 and 7 are charged in a constant current of 150 mA until the cell voltages become 4.2 V, and then a constant current and constant voltage charging applying 4.2 V is performed for twelve hours. Next, the cells are discharged in a constant current of 150 mA until the cell voltages becomes 1.75 V. Both cells finished the discharge after 11 hours. From the potential differences between the lithium electrode and the positive/negative electrodes, which are arranged in the cell, measured at every one hour, the results of right after charging, two hours after discharging, four hours after discharging, eight hours after discharging, and eleven hours after discharging are shown in table.

TABLE 2

| | Cell 6 | | Cell 7 | |
|---|---|---|---|---|
| Measuring Time | Negative electrode Potential (V) | Positive electrode Potential (V) | Negative electrode Potential (V) | Positive electrode Potential (V) |
| After charging | 0.04 | 4.24 | 0.05 | 4.25 |
| 2 hrs after discharging | 0.41 | 3.85 | 0.20 | 3.62 |
| 4 hrs after discharging | 0.82 | 3.82 | 0.21 | 3.21 |
| 8 hrs after discharging | 1.05 | 3.79 | 0.23 | 3.03 |
| 11 hrs after discharging | 2.01 | 3.76 | 0.24 | 1.99 |

Typically, the discharging potential of $LiCoO_2$ positive electrode is admitted to have a flat portion around 3.8 V, which does not accompany a temporal change. While the flat portion around 3.8 V not accompanying a temporal change can be found for the cell 6, it cannot be found for the cell 7. Therefore, it is thought that the electrical potential in the stack unit as well as the potential around the lithium electrode can be measured by using mesh rather than foil in the collector of the positive and negative electrodes.

Comparing with the above, if the collectors having openings that penetrate the front and rear surfaces of the positive and negative electrode collectors are used, the potentials of the positive and negative electrodes can be measured more exactly by using a reference electrode (lithium electrode in the present invention), therefore, it is more preferable than a case where foils are used in the collectors.

EFFECT OF THE INVENTION

As described above, an electrical storage device according to the present invention is an electrical storage device including a positive electrode, a negative electrode, a lithium electrode, all of which can be connected with a external circuits, and an electrolyte, which charges an opening gap of each electrode, in which the lithium electrode can supply lithium ion to the negative electrode by flowing a current between the lithium electrode and the negative electrode through an external circuit, thereby problems such as non-uniform carrying of lithium ion to the negative electrode, shape-change of a cell, and temperature increase of an electrolytic solution under a state of incomplete sealing of a cell can be easily solved, and the electrical storage device can be used for a long time owing to the rebirth of cells. In addition, the respective states of the positive and negative electrodes can be grasped by using the lithium electrode as a reference electrode. The electrical storage device having the above features can be preferably used for a film-type lithium ion secondary battery, a capacitor and the like.

The invention claimed is:

1. A manufacturing method of an electrical storage device comprising the steps of:

arranging a positive electrode, a negative electrode, and a lithium electrode out of direct contact with one another, sealing an electrolyte capable of transferring lithium ions using a laminated film in a manner such that a lithium electrode terminal of the lithium electrode protrudes outside of the laminated film; and supplying lithium ions to at least one of the negative electrode and the positive electrode by flowing current between the lithium electrode and the at least one of the negative electrode and the positive electrode before charging and discharging the electrical storage device.

2. The manufacturing method of an electrical storage device according to claim 1, wherein a part of lithium electrode exists in a lithium electrode collector after supplying the lithium ions.

* * * * *